(12) United States Patent
Baentsch et al.

(10) Patent No.: US 9,313,201 B2
(45) Date of Patent: Apr. 12, 2016

(54) SYSTEM AND METHOD OF PERFORMING ELECTRONIC TRANSACTIONS

(71) Applicant: International Business Machines Corporation, Armonk, NY (US)

(72) Inventors: Michael Baentsch, Gross (CH); Reto Hermann, Buttikon (CH); Thorsten Kramp, Kilchberg (CH); Thomas D. Weigold, Thalwil (CH); Peter Buhler, Horgen (CH); Thomas Eirich, Waedenswil (CH); Tamas Visegrady, Zurich (CH); Frank Hoering, Zurich (CH); Michael P. Kuyper-Hammond, Kaltbrunn (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/092,556

(22) Filed: Nov. 27, 2013

(65) Prior Publication Data

US 2014/0165145 A1   Jun. 12, 2014

Related U.S. Application Data

(60) Division of application No. 12/402,772, filed on Mar. 12, 2009, now Pat. No. 8,601,256, which is a continuation-in-part of application No. 12/274,100, filed on Nov. 19, 2008.

(30) Foreign Application Priority Data

Nov. 19, 2007   (EP) ..................................... 07022419

(51) Int. Cl.
*H04L 29/06* (2006.01)
*G06Q 20/08* (2012.01)
*G06Q 20/42* (2012.01)

(52) U.S. Cl.
CPC ........ *H04L 63/0869* (2013.01); *H04L 63/0471* (2013.01); *H04L 67/42* (2013.01);

(Continued)

(58) Field of Classification Search
CPC .............. H04L 63/166; H04L 63/0869; H04L 63/0471; H04L 63/0823; H04L 63/0853; H04L 67/42; G06Q 20/08; G06Q 20/42
USPC ............................................... 726/3; 709/249
See application file for complete search history.

(56) References Cited

U.S. PATENT DOCUMENTS

| 5,596,718 A | 1/1997 | Boebert et al. |
| 5,602,918 A | 2/1997 | Chen et al. |

(Continued)

FOREIGN PATENT DOCUMENTS

| FR | 2 820 231 | 8/2002 |
| JP | 9219700 A | 8/1997 |

(Continued)

OTHER PUBLICATIONS

Weigold, et al., The Zurich Trusted Information Channel—An Eddicient Defence Against Man-in-the-Middle and Malicious Software Attacks, Mar. 11-12, 2008, Springer Verlag, pp. 75-91.*

(Continued)

*Primary Examiner* — Michael S McNally
(74) *Attorney, Agent, or Firm* — Scully, Scott, Murphy & Presser, P.C.; Jennifer Davis, Esq.

(57) ABSTRACT

A system and method of performing electronic transactions between a server computer and a client computer. The method implements a communication protocol with encrypted data transmission and mutual authentication between a server and a hardware device via a network, performs a decryption of encrypted server responses, forwards the decrypted server responses from the hardware device to the client computer, displays the decrypted server responses on a client display, receives requests to be sent from the client computer to the server, parses the client requests for predefined transaction information by the hardware device, encrypts and forwards client requests, displays the predefined transaction information upon detection, forwards and encrypts the client request containing the predefined transaction information to the server if a user confirmation is received, and cancels the transaction if no user confirmation is received.

2 Claims, 13 Drawing Sheets

(52) U.S. Cl.
CPC ............. *G06Q 20/08* (2013.01); *G06Q 20/42* (2013.01); *H04L 63/0823* (2013.01); *H04L 63/0853* (2013.01); *H04L 63/166* (2013.01); *H04L 2463/102* (2013.01)

(56) References Cited

U.S. PATENT DOCUMENTS

| | | | |
|---|---|---|---|
| 6,282,542 B1* | 8/2001 | Carneal et al. | |
| 6,343,350 B1* | 1/2002 | LaMaire et al. | 711/156 |
| 6,389,462 B1* | 5/2002 | Cohen et al. | 709/218 |
| 6,694,436 B1 | 2/2004 | Audebert | |
| 6,718,390 B1 | 4/2004 | Still et al. | |
| 6,850,909 B1 | 2/2005 | Aiello et al. | |
| 6,895,502 B1 | 5/2005 | Fraser | |
| 6,934,841 B2 | 8/2005 | Boyles et al. | |
| 6,941,404 B2 | 9/2005 | Oerlemans et al. | |
| 6,996,840 B1 | 2/2006 | Wettergren | |
| 7,010,681 B1 | 3/2006 | Fletcher et al. | |
| 7,127,607 B1 | 10/2006 | Su et al. | |
| 7,216,237 B2 | 5/2007 | Vanstone | |
| 7,228,424 B2 | 6/2007 | Raheman | |
| 7,270,276 B2 | 9/2007 | Vayssiere | |
| 7,275,160 B2 | 9/2007 | Pearson et al. | |
| 7,296,149 B2 | 11/2007 | Hiltgen | |
| 7,302,585 B1 | 11/2007 | Proudler et al. | |
| 7,472,413 B1 | 12/2008 | Mowshowitz | |
| 7,725,933 B2 | 5/2010 | Fascenda | |
| 7,801,827 B2 | 9/2010 | Bishop et al. | |
| 7,853,997 B2 | 12/2010 | Conti | |
| 7,953,968 B2 | 5/2011 | Robertson et al. | |
| 8,099,769 B2 | 1/2012 | Vanstone | |
| 8,214,642 B2 | 7/2012 | Baentsch et al. | |
| 8,799,171 B2 | 8/2014 | Baentsch et al. | |
| 2001/0044818 A1* | 11/2001 | Liang | 709/201 |
| 2002/0023215 A1 | 2/2002 | Wang et al. | |
| 2002/0161655 A1 | 10/2002 | Bredin | |
| 2003/0014632 A1 | 1/2003 | Vanstone | |
| 2003/0080852 A1 | 5/2003 | Harris | |
| 2003/0172167 A1 | 9/2003 | Judge et al. | |
| 2004/0065728 A1 | 4/2004 | Tournier | |
| 2004/0088562 A1 | 5/2004 | Vassilev et al. | |
| 2004/0095894 A1 | 5/2004 | Eloranta et al. | |
| 2005/0097363 A1 | 5/2005 | Bajko et al. | |
| 2005/0160161 A1* | 7/2005 | Barrett et al. | 709/223 |
| 2006/0168221 A1* | 7/2006 | Juhls et al. | 709/225 |
| 2006/0185021 A1 | 8/2006 | Dujari et al. | |
| 2006/0294023 A1 | 12/2006 | Lu | |
| 2007/0130617 A1 | 6/2007 | Durfee et al. | |
| 2007/0132733 A1 | 6/2007 | Ram | |
| 2007/0192875 A1 | 8/2007 | Yoon et al. | |
| 2007/0198825 A1 | 8/2007 | Schwarz | |
| 2007/0260555 A1 | 11/2007 | Ho et al. | |
| 2007/0291936 A1 | 12/2007 | Milana et al. | |
| 2007/0300057 A1 | 12/2007 | Corcoran et al. | |
| 2008/0189363 A1* | 8/2008 | Tian | 709/203 |
| 2008/0294563 A1 | 11/2008 | Boutahar et al. | |
| 2009/0106556 A1 | 4/2009 | Hamid | |
| 2012/0233465 A1 | 9/2012 | Baentsch et al. | |

FOREIGN PATENT DOCUMENTS

| | | | |
|---|---|---|---|
| JP | 2001508892 A | 7/2001 |
| JP | 2002517036 A | 6/2002 |
| JP | 2002324202 A | 11/2002 |
| JP | 2003196158 A | 7/2003 |
| JP | 2003348074 A | 12/2003 |
| JP | 2005509334 A | 4/2005 |
| JP | 2005149036 A | 6/2005 |
| JP | 2007249805 A | 9/2007 |

OTHER PUBLICATIONS

Pohls et al., "Smartcard Firewalls Revisited", Smart Card Research and Advanced Applications Lecture Notes in Computer Science; LNCS, Springer, Berlin, DE, vol. 3928, Jan. 1, 2006, pp. 179-191, XP019029955, ISBN: 978-3-540-33311-1.

International Search Report dated Jun. 19, 2009.

Office Action dated Jun. 10, 2011 received in a related U.S. Appl. No. 12/274,100.

European Office Action dated Sep. 15, 2011 received in a related European Application No. 08 851 270.2.

Final Office Action dated Dec. 2, 2011 from related U.S. Appl. No. 12/274,100.

United States Official Action dated May 23, 2012 from related U.S. Appl. No. 12/274,100.

United States Official Action dated Oct. 12, 2012 from related U.S. Appl. No. 12/274,100.

European Office Action dated Oct. 16, 2013 received in a related European Application No. EP 08 851 270.2-1856.

European Office Action dated Oct. 1, 2012 received in a related European Application No. EP 08 851 270.2-2413.

International Preliminary Report on Patentability dated May 25, 2010 received in related application PCT/IB2008/054782.

Letter from IBM Japan which indicates that the date of the issued Office Action is May 21, 2013.

U.S. Office Action dated Mar. 19, 2012 in related U.S. Appl. No. 12/402,772.

U.S. Office Action dated Oct. 6, 2011 received in the related U.S. Appl. No. 12/402,772.

U.S. Office Action dated Jun. 9, 2011 received in the related U.S. Appl. No. 12/402,772.

* cited by examiner

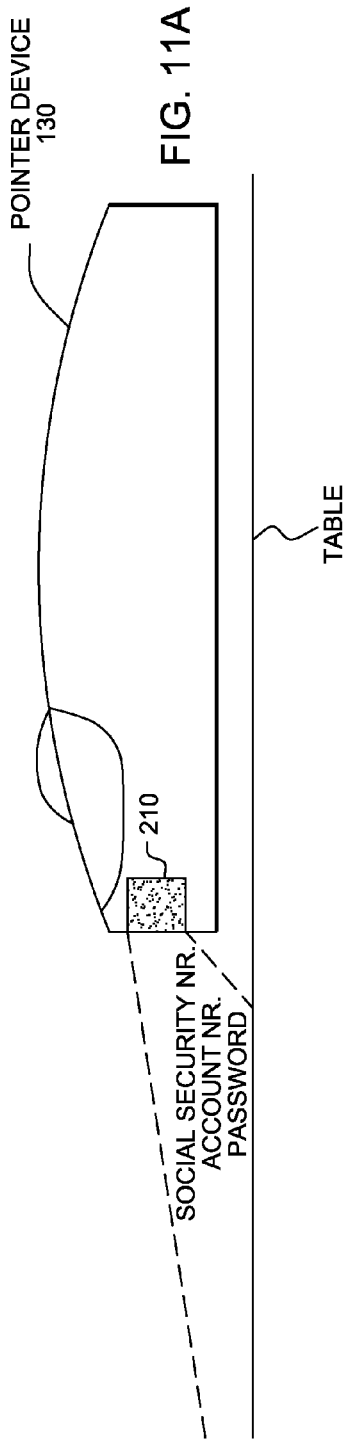
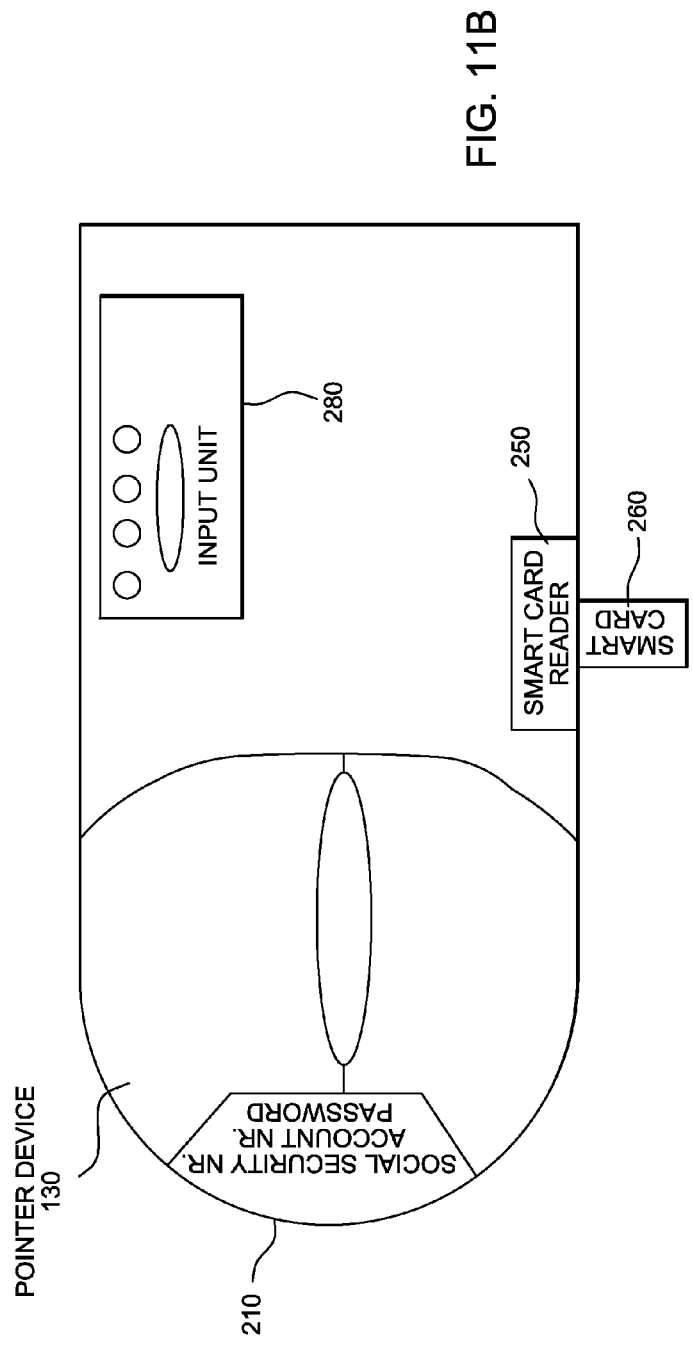

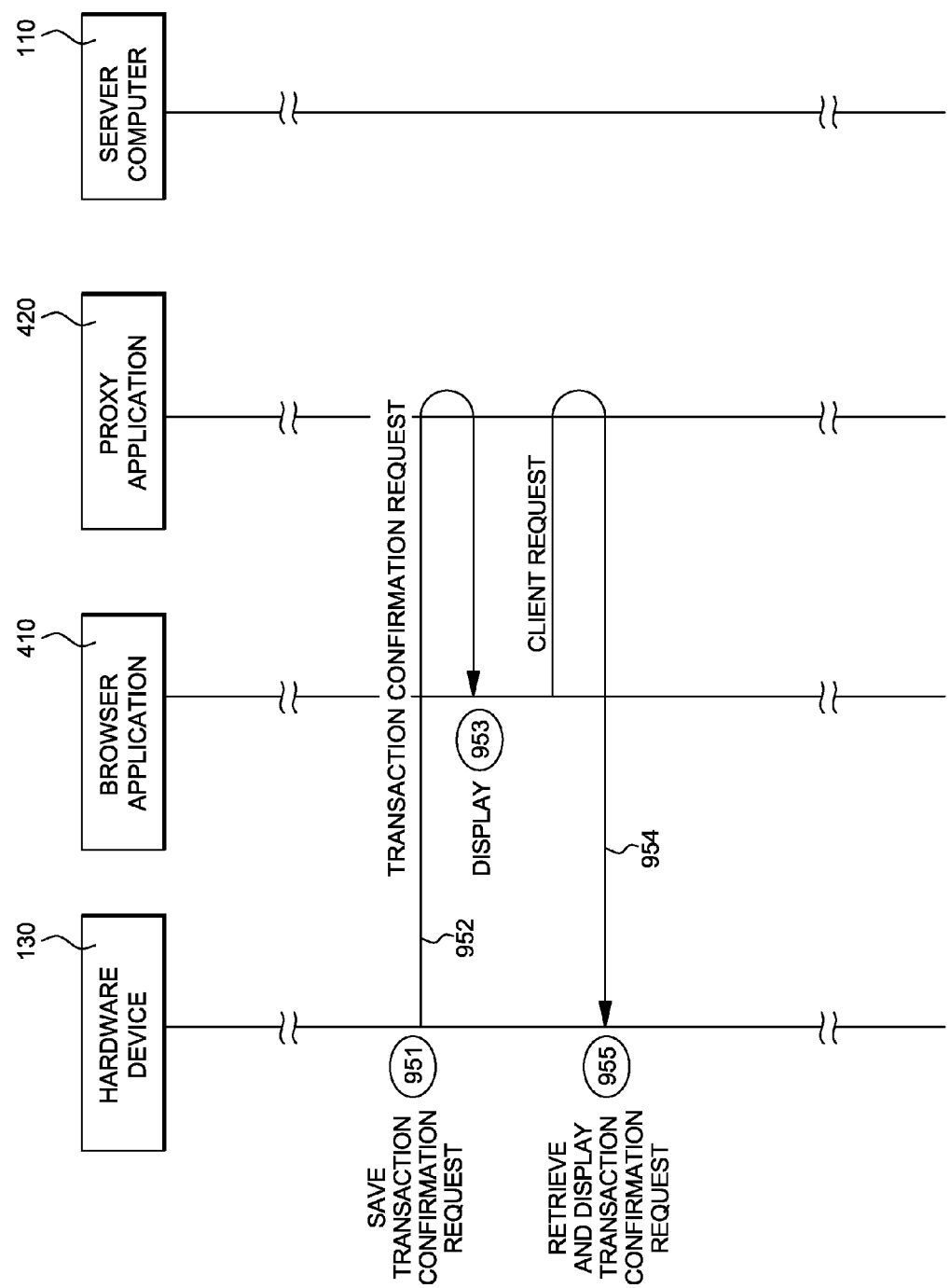

SYSTEM AND METHOD OF PERFORMING ELECTRONIC TRANSACTIONS

CROSS-REFERENCE TO RELATED APPLICATION

This application is a divisional application of U.S. application Ser. No. 12/402,772 filed on Mar. 12, 2009, which is a Continuation in Part of U.S. patent application Ser. No. 12/274,100, all of which are hereby incorporated by reference into the present application. This application also claims priority to European Application EP 07022419.1 filed on Nov. 19, 2007.

BACKGROUND OF THE INVENTION

1. Field of the Invention

The present invention is related to performing secure electronic transactions. More particularly, the invention relates to a system which can include a server computer, a hardware device, a client computer and a computer program.

2. Description of Related Art

Current Internet authentication processes often utilize Public Key Infrastructure (PKI). Especially in the presence of malicious software on a Personal Computer (PC) of a user, it may be uncertain whether the user is connected to the desired server computer he wants to transact with, for example a desired banking server. One known method to prevent adversarial attacks is to ask the user to check server certificates that have been issued by a trusted entity to the server operator. Since this is cumbersome, many users refrain from performing the server certificate check. Another known approach uses PKI-technology in combination with smart cards. However, the user does not have full control over what the smart card actually does, for example what it signs or where it connects to. This is caused by the fact that Internet connections can be compromised by men-in-the-middle attacks, worms or viruses running on the PC of the user. Furthermore, keyboard logging software and display-altering software can be used to trick the user into working with a bogus website, for example to transmit some money to a bank account of an adversary.

The above describes approaches that rely at some point in the process on a step in which the server displays some confidential or secret information on the PC and/or on a step in which the user enters some confidential or secret information on the PC. This is true even for secure smart card readers featuring a display and keyboard. The information that a secure smart card reader displays is still controlled by software running on the PC.

U.S. Pat. No. 6,895,502B1 describes a method of securely displaying and securely confirming that a request to access a resource on a server computer was actually requested by the client user. In response to the request the server computer sends an encrypted challenge to a secure environment that allows the client user to check and confirm that he made the corresponding request.

U.S. Pat. No. 5,596,718 describes a secure user interface created by inserting a trusted path subsystem between input/output devices of a workstation and the workstation itself. The trusted path subsystem is invoked manually by a user and utilizes the display of the workstation for displaying a trusted window.

SUMMARY OF THE INVENTION

It is an object of the invention to provide other solutions for performing electronic transactions in a secure way. It is a further object of the invention to provide solutions for performing electronic transactions that can be implemented in a cost efficient way. It is a further object of the invention to provide solutions for performing electronic transactions with improved ease of use. It is a further object of the invention to provide solutions for performing electronic transactions in a secure way that can utilize existing server infrastructures without adaptation of the servers. It is a further object of the invention to provide solutions for performing electronic transactions in a secure way that can utilize existing stream authentication protocols such as SSL/TLS.

In accordance with a first aspect of the invention, there is provided a server computer having a processor device for executing server logic, the server device comprising:

first server logic executed by the processor device for configuring the processor device to execute a first communication protocol with encrypted data transmission and mutual authentication with a hardware device, second server logic executed by the processor device for configuring the processor device to exchange messages related to electronic transactions with a client computer via a communication network and via the hardware device, third server logic executed by the processor device for configuring the processor device to parse client requests received from the hardware device for predefined transaction information, fourth server logic executed by the processor device for configuring the processor device to send, upon detection of predefined transaction information in a client request, a server response comprising a transaction confirmation request to the hardware device, the processor device responsive to the server response to defer performance of an electronic transaction related to the received predefined transaction information, and, fifth server logic executed by the processor device for configuring the processor device to perform the deferred electronic transaction upon receipt of a client request from the hardware device comprising a transaction confirmation message that confirms the deferred electronic transaction.

Further to this aspect, the server computer device further comprises: additional server logic executed by the processor device for configuring the processor device to include a challenge related to the predefined transaction information in the server response.

Further to this aspect, the server computer device further comprises a memory storage device for storing rule data, the rule data defining transaction information that require user confirmation.

In accordance with a second aspect of the invention, there is provided a hardware device for controlling electronic transactions, the hardware device including a processor device for executing logic, the hardware device comprising:

a user interface for presenting information to a user; and a hardware device interface unit, wherein the hardware device interface unit is provided for coupling the hardware device to a client computer, first hardware device logic executed by the processor device for configuring the processor device to run a first communication protocol with encrypted data transmission and mutual authentication with a server computer, second hardware device logic executed by the processor device for configuring the processor device to receive client requests to be sent from the client computer to the server computer, third hardware device logic executed by the processor device for configuring the processor device to encrypt and forward client requests to the server computer, fourth hardware device logic executed by the processor device for configuring the processor device to receive a server response from the server computer comprising a transaction confirmation request related to a previous client request, fifth hardware device logic executed by the processor device for configuring the processor device to present the transaction confirmation request to a user via the user interface, the transaction confirmation request prompting a user for user confirmation, and sixth hardware device logic executed by the processor device for configuring the processor device to send a client request comprising a transaction confirmation message related to the transaction confirmation request back to the server computer upon user confirmation.

Further, the processor device of the hardware device is configured to execute further hardware device logic for configuring the hardware device to:

receive a challenge from the server computer related to the transaction confirmation request, generate a cryptographic response to the challenge and include the cryptographic response in the transaction confirmation message upon the user confirmation.

Further, the processor device of the hardware device is configured to execute further hardware device logic for configuring the hardware device to sign the transaction confirmation message.

The hardware device may according to an embodiment of the invention be configured to sign a transaction confirmation message by means of a signature key stored in a memory of the hardware device or by means of a signature key received from a smart card via a smart card interface of the hardware device.

In still yet another aspect of the invention, there is provided a hardware device for controlling electronic transactions, the hardware device comprising a user interface for presenting information to a user and a hardware device interface unit for coupling the hardware device to a client computer, the hardware device comprising:

a proxy application;

a processor device configured for loading the proxy application on the client computer via the hardware device interface unit, wherein the proxy application on the client computer is configured to forward client requests received from a browser application executing at the client computer to the hardware device; and, wherein the proxy application is further configured to: forward client requests from the hardware device via a communication network to a server computer, and, forward server responses received from the server computer to the hardware device and from the hardware device to the browser application on the client computer.

Further to this aspect, the proxy application configures a processor device to read and write a virtual file on the hardware device.

In still another aspect of the invention, there is provided a computer pointer device for a computer system, operable in communication with the computer system for receiving communications there from, the computer pointer device comprising:

at least one processor device for operating in a first operating mode and a second operating mode, wherein the at least one processor device is configured for performing electronic transactions with a server computer by means of a first communication protocol in the second operating mode;

one or more button or key means for responding to information displayed by the pointer device; and a means for displaying from the device, readable transaction information to a user.

Further, in the computer pointer device, the processor is operable in a first sub-mode of the second operating mode and a second sub-mode of the second operating mode, wherein the processor is configured in the first sub-mode to exchange messages between the client computer and the server computer that do not comprise any predefined transaction information while concurrently providing at least a part of the functionality of the first operating mode, and, wherein the processor is configured in the second sub-mode to interrupt the functionality of the first mode upon detection of predefined transaction information and to present the predefined transaction information by its display means to prompt for user confirmation.

According to a further aspect of the invention, there is provided a system and method of performing an electronic transaction between a server computer and a client computer. The method comprises the steps of:

providing a first communication protocol with encrypted data transmission and mutual authentication between the server computer and a hardware device via a communication network, exchanging messages related to the electronic transaction with a client computer via the communication network and via the hardware device, parsing client requests received from the hardware device for predefined transaction information, sending, upon detection of predefined transaction information in a client request, a server response comprising a transaction confirmation request to the hardware device, deferring performance of an electronic transaction related to the received predefined transaction information, and, initiating performance of the deferred electronic transaction upon receipt of a client request from the hardware device comprising a transaction confirmation message that confirms the deferred electronic transaction.

Further to this aspect of the invention, the method further comprises:

sending encrypted server responses to hardware device, the server responses being provided for decryption by the hardware device and for forwarding to the client computer, and, receiving client requests of the client computer via the hardware device, the client requests being encrypted by the hardware device.

This aspect of the invention further comprises: sending the transaction confirmation request to the hardware device in a packet header communicated in accordance with the first communication protocol.

A further aspect of the invention provides a method for executing a secure transaction between a client computer and a server computer via a communication network, the client computer having an associated pointer device operable in a first mode of operation and a second mode of operation, the method comprising:

running, in the second operating mode, a communication protocol with encrypted data transmission and mutual authentication between the pointer device and the server computer;

scanning in a first sub-mode of the second operating mode messages to be exchanged between the client computer and the server computer via the pointer device for predefined transaction information;

switching into a second sub-mode of the second operating mode upon detection of predefined transaction information;

presenting the predefined transaction information in the second sub-mode to the user by the pointer device to prompt for a user confirmation;

forwarding the predefined transaction information to the server computer if a user confirmation is received.

Moreover, the method of the further embodiment further comprises:

providing by the pointer device in the first sub-mode of the second operating mode at least a part of the functionality of the first mode, interrupting, in the second sub-mode of the second operating mode, the functionality of the first mode, returning to the first sub-mode of the second operating mode upon the user confirmation.

Yet according to a further aspect of the invention, there is provided a computer pointer device for a computer system, operable in communication with the computer system for receiving communications there from, the computer pointer device comprising:

at least one processor device for operating in a first operating mode and a second operating mode, wherein the at least one processor device is configured for performing electronic transactions with a server computer by means of a first communication protocol in the second operating mode;

one or more button or key means for responding to information displayed by the pointer device; and a means for displaying from the device, readable transaction information to a user.

According to this further aspect of the invention, the processor device is operable in a first sub-mode of the second operating mode and a second sub-mode of the second operating mode, wherein the processor device is configured in the first sub-mode to exchange messages between the client computer and the server computer that do not comprise any predefined transaction information while concurrently providing at least a part of the functionality of the first operating mode, and, wherein the processor is configured in the second sub-mode to interrupt the functionality of the first mode upon detection of predefined transaction information and to present the predefined transaction information by its display means to prompt for user confirmation.

Moreover, in the computer pointer device, the at least one processor comprises a switch that is controlled by the client computer, wherein the switch controls whether the pointer device operates in the first operating mode or the second operating mode.

In one embodiment, the switch is actuated by the proxy application executing in the client computer.

The computer pointer device may according to an embodiment of the invention comprise a smart card reader for reading security sensitive data from a smart card or a security token for storing security sensitive data.

Another embodiment of the invention is directed to a method for performing electronic transactions between a client computer and a server computer by means of a hardware device, the hardware device comprising a user interface for presenting information to a user and a hardware device interface unit, wherein the hardware device interface unit is provided for coupling the hardware device to the client computer, the method comprising:

running, at the hardware device, a first communication protocol with encrypted data transmission and mutual authentication with a server computer;

receiving, at the hardware device, client requests to be sent from the client computer to the server computer;

encrypting the client requests at the hardware device, and forwarding client requests to the server computer; receiving, at the hardware device, a server response from the server computer comprising a transaction confirmation request related to a previous client request;

presenting, at the hardware device, the transaction confirmation request to a user via the user interface to prompt for user confirmation;

sending a client request comprising a transaction confirmation message related to the transaction confirmation request back to the server computer upon user confirmation.

Another embodiment of the invention is directed to a hardware device for controlling electronic transactions, comprising a user interface and a hardware device interface unit, wherein the hardware device interface unit is provided for coupling the hardware device to a client computer, the hardware device comprising:

a processor device executing program of instructions for configuring the processor device to run a first communication protocol with encrypted data transmission and mutual authentication with a server computer;

perform a decryption of encrypted server messages received from the server computer; forward decrypted server messages to the client computer;

receive client messages to be send from the client computer to the server computer;

encrypt and forward client messages to the server computer by means of the first communication protocol;

present predefined transaction information of the client messages and/or server messages by the user interface to prompt for authorization of the predefined transaction information; and, send upon authorization the predefined transaction information to the server computer.

BRIEF DESCRIPTION OF THE DRAWINGS

The drawings are provided for illustrative purpose only and do not necessarily represent practical examples of the present invention to scale. In the figures, same reference signs are used to denote the same or like parts.

FIG. 11A illustrates a lateral view of the hardware device and FIG. 11B illustrates a top view of a hardware device according to another embodiment of the present invention;

FIG. 13 shows schematic illustrations of message flows according to an embodiment of the invention that may be added to the message flow of FIG. 9.

DETAILED DESCRIPTION OF THE PREFERRED EMBODIMENTS

Preferred embodiments of the invention are described in detail below, by way of example only, with reference to the following drawings.

Any disclosed embodiment can be combined with one or several of the other embodiments shown and/or described. This is also possible for one or more features of the embodiments.

Figure 1:
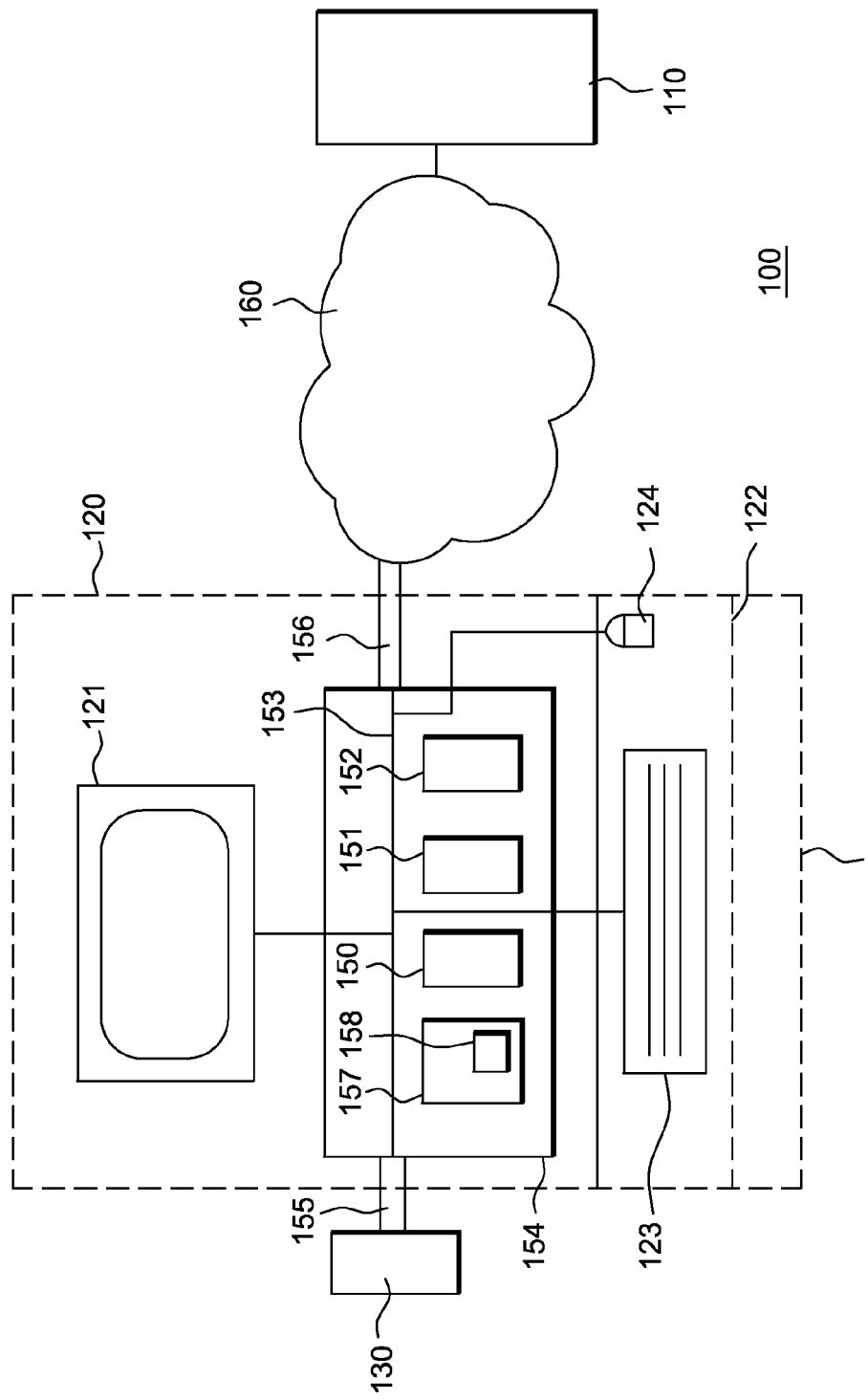
FIG. 1 is a block diagram of a system according to an embodiment of the present invention.

FIG. 1 shows a system 100 according to an embodiment of the present invention. The system 100 includes a server computer 110, a client computer 120 and a hardware device 130. The client computer 120 includes a client computer display 121 and a client computer input unit 122. The client computer input unit 122 includes a keyboard 123 and a mouse 124. The client computer 120 further includes a processing unit 150, memory 151 (e.g., a volatile memory device) and storage 152 coupled by means of a bus system 153 and arranged in a computer case 154. The storage 152 can include a non-volatile memory device (e.g., EEPROM, ROM, PROM, RAM, DRAM, SRAM, flash, firmware, programmable logic, etc.), magnetic disk drive, optical disk drive, tape drive, etc. The storage 152 can include an internal storage device, an attached storage device and/or a network accessible storage device. The client computer 120 can include a program logic 157 including program code 158 that can be loaded into the memory 151 and executed by the processing unit 150. In certain embodiments, the program logic 157 including the program code 158 can be stored in the storage 152. Therefore, while FIG. 1 shows the program logic 157 separately from the other elements, the program logic 157 can be implemented in the storage 152.

The client computer 120 is coupled to a communication network 160 via a first interface 156. The first interface 156 can be a wireless or a wired interface, in particular an Universal Serial Bus (USB)-interface. The communication network 160 can be the Internet. The client computer 120 is coupled to the hardware device 130 via a second interface 155. The second interface 155 can be a wireless or a wired interface, in particular an USB-interface. The client computer 120 can be a Personal Computer (PC). The server computer 110 is coupled to the communication network 160 as well. Examples of the server computer 110 can be the server computer of a bank, an insurance company or an entity that offers electronic transactions via the communication network 160, in particular the Internet.

This embodiment of the invention addresses system aspects of a system in which the method of an embodiment of the invention can be performed.

Figure 2:
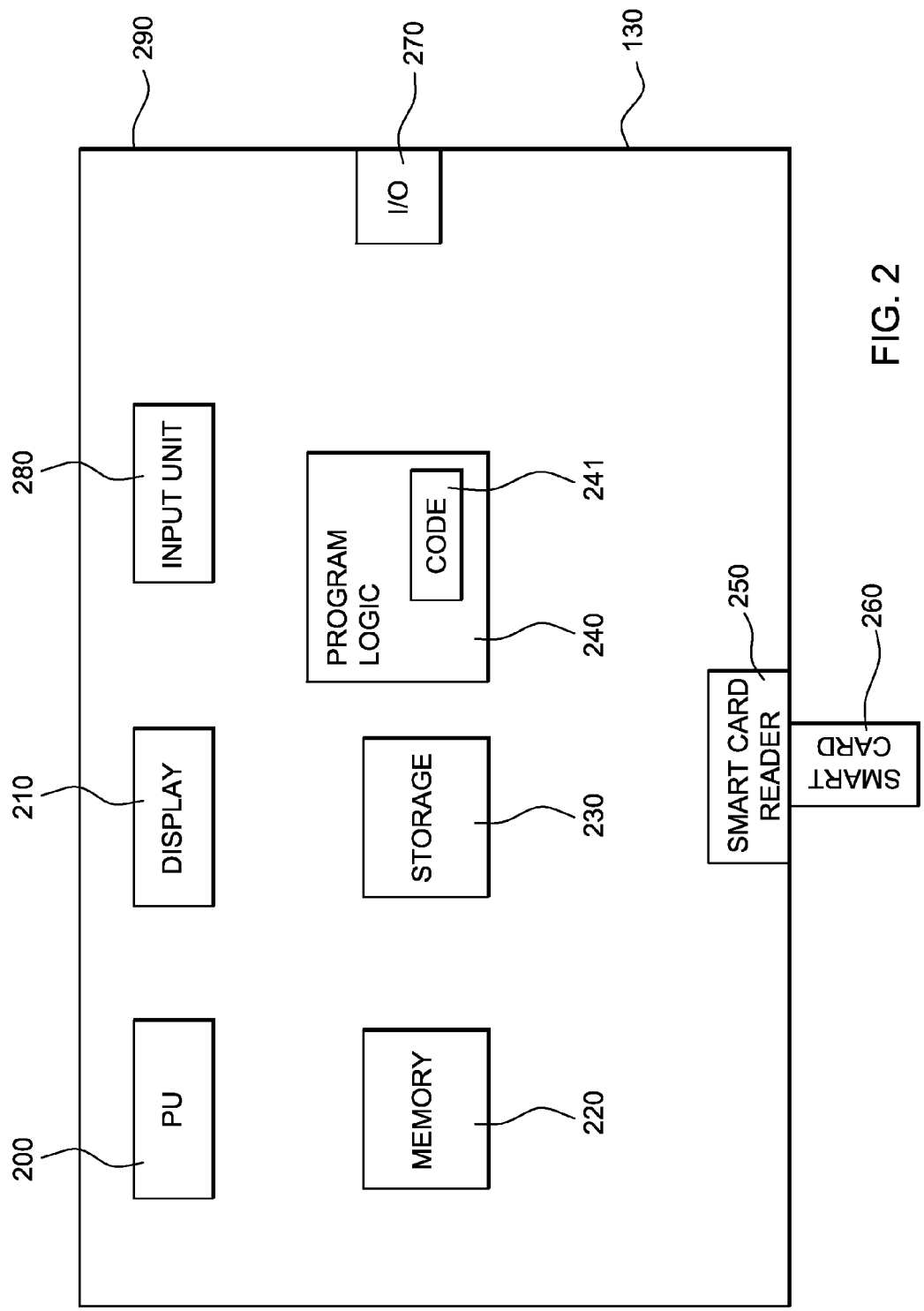
FIG. 2 is a block diagram of a hardware device according to an embodiment of the present invention.

FIG. 2 shows an embodiment of the hardware device 130 of FIG. 1 in more detail. The hardware device 130 includes a processing unit 200, a hardware device display 210, memory 220 (e.g., a volatile memory device) and storage 230. The storage 230 can include a non-volatile memory device (e.g., EEPROM, ROM, PROM, RAM, DRAM, SRAM, flash, firmware, programmable logic, etc.). The hardware device 130 can include a program logic 240 including program code 241 that can be loaded into the memory 220 and executed by the processing unit 200. In certain embodiments, the program logic 240 including the program code 241 can be stored in the storage 230. Therefore, while FIG. 2 shows the program logic 240 separately from the other elements, the program logic 240 can be implemented in the storage 230. The hardware device 130 further includes a smart card reader 250, a hardware device interface unit 270, also denoted as I/O-unit 270, and a hardware device input unit 280. The hardware device interface unit 270 can be a wireless or wired interface, in particular a Universal Serial Bus (USB)-interface. The hardware device interface unit 270 can be used to connect or couple the hardware device 130 to the client computer 120. The hardware device input unit 280 is provided for user input and can include one or more buttons or a complete keyboard. As an example, the hardware device input unit 280 could consist of only two buttons, one cancel-button for canceling a transaction and one confirm-button for confirming a transaction. The hardware device 130 is covered by a housing 290, for example by a plastic housing.

The smart card reader 250 can read security sensitive data from a smart card 260, in particular security sensitive user data, such as a private key and trust root information.

Figure 3:
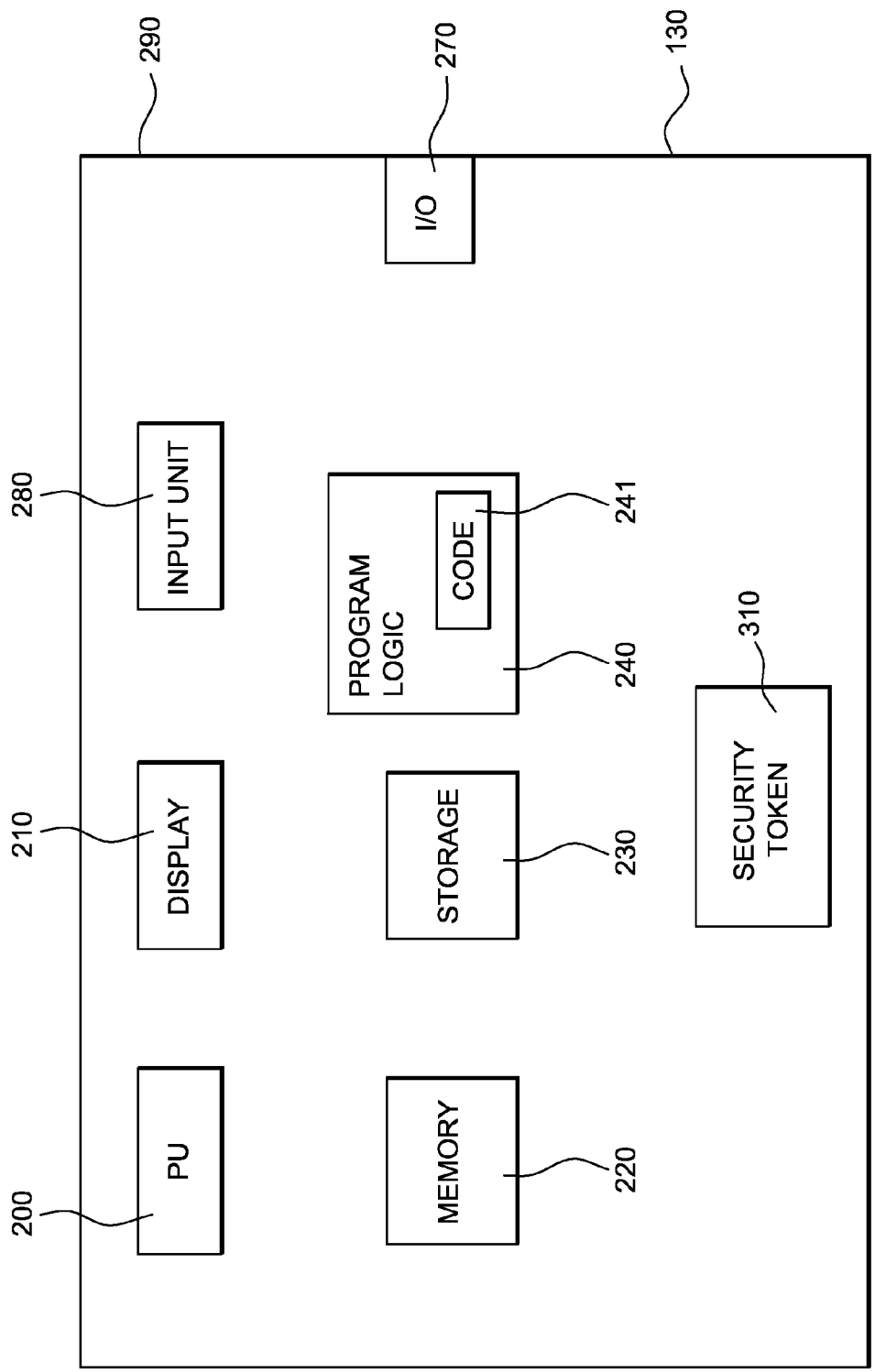
FIG. 3 is a block diagram of a hardware device according to another embodiment of the present invention.

FIG. 3 shows another embodiment of the hardware device 130 in FIG. 1 in more detail. The hardware device 130 according to the embodiment of FIG. 3 includes the processing unit 200, the hardware device display 210, the memory 220, the storage 230, the program logic 240 including the program code 241, the hardware device interface unit 270, the hardware device input unit 280 and the housing 290 as described with reference to FIG. 2.

This embodiment further includes a built-in security token 310 for storing security sensitive data such as a private key and trust root information. An example of the security token 310 can be a smart card chip.

The hardware device 130 is preferably initialized in a trusted and secure environment, for example on a secure site of a bank. Such an initialization includes, for example, the loading of the security sensitive information on the security token 310 or on the smart card 260. The hardware device 130 can be implemented, for example, as an USB-stick.

Such a hardware device can be implemented and used in a flexible and efficient way for improving the security of electronic transactions. In particular there is no need to implement changes on the side of the server computers if the first communication protocol is known to the server such as SSL. The hardware device can work together with common client computers such as desktop PCs or laptops. The coupling between the client computer and the hardware device can be implemented by connecting the hardware device interface unit to a first interface of the client computer. The hardware device interface unit can be a wireless or a wired interface unit. As an example, the hardware device interface unit can be a Universal Serial Bus (USB)-interface.

An embodiment of the invention can include a hardware device which includes a security token for storing security sensitive data. The security token is a hardware unit, also denoted as hardware token, which can store security sensitive data, in particular security sensitive user data, in a tamper-resistant way. In other words, security sensitive data stored in the security token cannot be read out or manipulated. The degree or level of tamper resistance can be adapted to the security requirements of the respective application. For example, the security token can be a hardware component including a smartcard chip that stores the security sensitive data.

An embodiment of the invention can include a hardware device which includes a smart card reader for reading security sensitive data from a smart card. The smartcard chip of the smartcard stores the security sensitive data. The smartcard can be kept by the user at a different place than the hardware device. Before running the hardware device, the user has to put the smart card into the smart card reader of the hardware device.

An embodiment of the invention can include a hardware device which has one or more predefined levels of tamper-resistance. The predefined levels of tamper resistance can be adapted to the security requirements of the respective application. The higher the security requirements of the application, the higher the level of tamper resistance should be chosen. Preferably, the level of tamper resistance is tamper proof.

The predefined levels of tamper resistance can address different attacks, such as a level of tamper resistance against malicious software or a level of tamper resistance against physical manipulation of the hardware or a level of tamper-resistance against inspection of the hardware device, in particular inspection of the storage or the memory, by means of a microscope. Malicious software, also denoted as malware, can be understood as any software that has the intention to harm, alter, or manipulate the correct function of the hardware device. For example, malicious software can be a virus, a worm, a trojan horse, spyware or other unwanted software. In other words, malicious software is software that is designed to infiltrate, damage or harm a computer system.

An embodiment of the invention can include a predefined level of tamper-resistance of the hardware device which is higher than the level of tamper-resistance of the client computer. This means that it is more difficult for an adversary to manipulate or tamper the hardware device than to manipulate the client computer. Concentrating on the tamper resistance of the hardware device is more cost efficient than improving the tamper resistance of the whole client computer. In particular it is more difficult for an adversary to place malicious software on the hardware device than on the client computer.

An embodiment of the invention can include a hardware device which is designed in such a way that no software applications can be loaded onto the hardware device. This prevents viruses, worms or other malicious software that can manipulate or harm the functioning of the hardware device. For example, this embodiment can be implemented by storing the program or programs of the hardware device in a fused memory. In other words, after having loaded the program or the programs in the program memory of the hardware device, the program memory is fused. This prevents that any further programs from being loaded and run on the hardware device.

An embodiment of the invention can include security sensitive data which includes a private key and trust root information. The private key is used for performing the first communication protocol with the server computer, in particular the mutual authentication. The trust root information defines which authorities the hardware device trusts. For example, the trust root information can include one or more certificate authority root keys of certificate authorities that the hardware device trusts. This allows the use of Public Key Infrastructure (PKI)-technology for performing the mutual authentication of the first communication protocol.

An embodiment of the invention can include a hardware device which includes a hardware device input unit for confirming and/or canceling a transaction. For example, the hardware device input unit can be established by one or more buttons such as a confirm-button and/or a cancel-button. This embodiment of the invention addresses a hardware device in which the method of the seventh embodiment of the invention can be performed.

The steps of the different embodiment of the invention can be performed in different orders. Furthermore, the steps can also be combined, for example two or more steps being performed together.

Any of the device features can be applied to the method embodiment of the invention and vice versa. Advantages of the device features apply to corresponding method features and vice versa.

The steps of the different embodiment of the invention can be performed in different orders. Furthermore, the steps can also be combined, for example two or more steps being performed together.

Any of the device features can be applied to the method embodiment of the invention and vice versa. Advantages of the device features apply to corresponding method features and vice versa.

Figure 4:
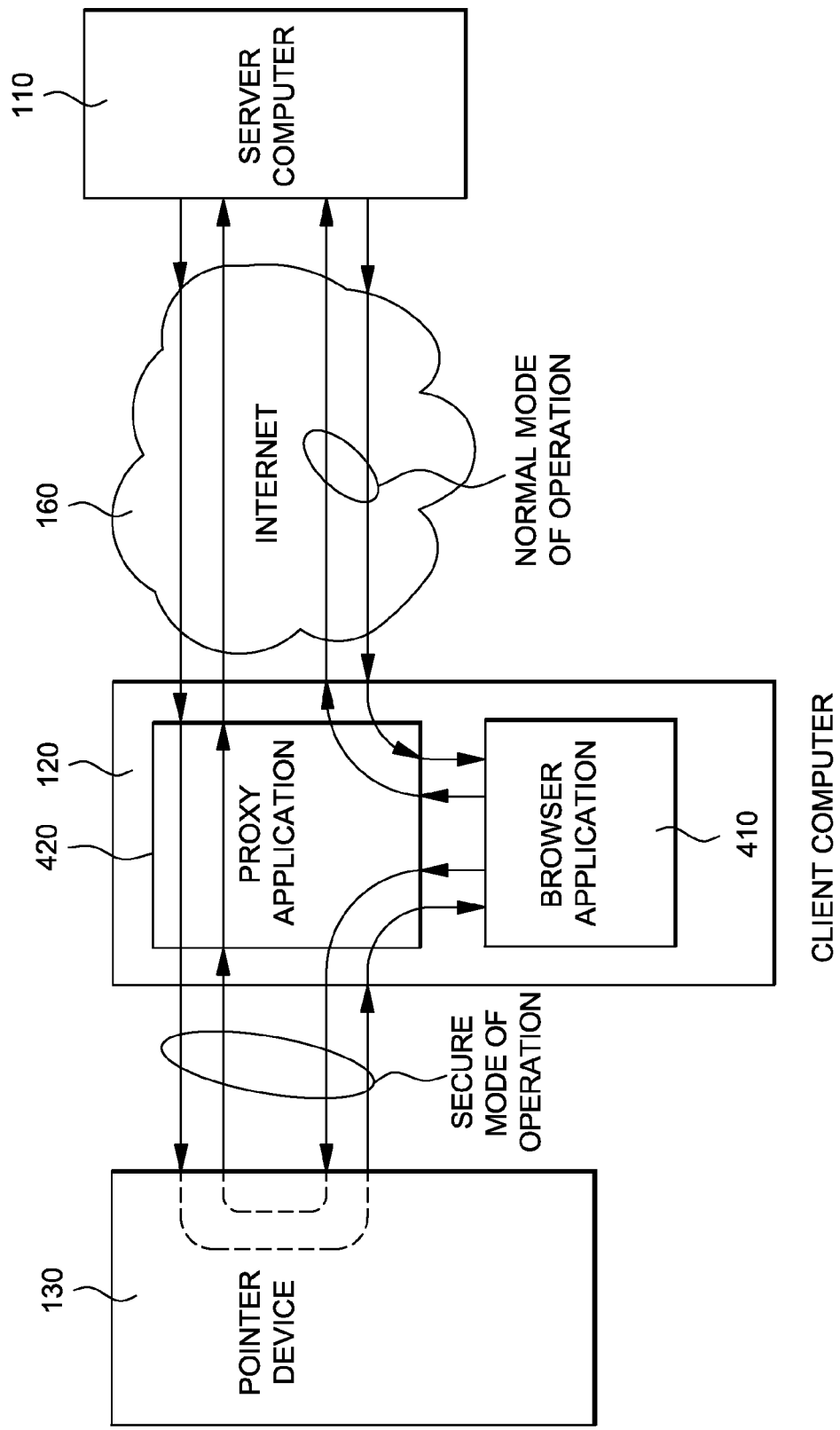
FIG. 4 illustrates the communication flow between a browser application, a proxy application, the hardware device and a server computer according to an embodiment of the present invention.

FIG. 4 illustrates the communication flow between a browser application 410 running on the client computer 120, a proxy application 420 running on the client computer 120, the hardware device 130, the communication network 160 and the server computer 110.

Such a client computer can be implemented in an efficient way. The proxy application allows upgrading of common client computers and makes them interoperable with the hardware device.

According to an embodiment of the invention the browser application 410 and the proxy application 420 are implemented as program code 158 of the program logic 157 of the client computer 120 as described with reference to FIG. 1. The browser application 410 can be in particular a web browser that enables a user to display and interact with text, images, videos, music and other information that can be located on a web page or website of the Internet. In particular, the browser application 410 enables a user to display and interact with text, images, videos, music and other information that is accessible via the communication network 160 from the server computer 110. The browser application 410 can communicate with the server computer 110 via the proxy application 420 and via the communication network 160. An example of the browser application 410 communicating with the server computer 110 via the proxy application 420 and via the communication network 160 is using HTTP-protocol in the application layer and the Transmission Control Protocol/Internet Protocol (TCP/IP) in the network layer.

In a normal mode of operation the browser application 410 connects via the proxy application 420 to the communication network 160. In the normal mode of operation the browser application 410 runs a second communication protocol and can send client requests such as HTTP get requests, via the proxy application 420 and the communication network 160 to the server computer 110. In the other direction, the server computer 110 can send, in the normal mode of operation, server responses such as HTTP-responses, via the communication network 160 and the proxy application 420 to the browser application 410. In the normal mode of operation the proxy application 420 works as forwarder between the browser application 410 and the communication network 160, while concurrently observing and parsing respectively the client requests for a predefined set of client requests. An example of a predefined set of client requests can be a set of Uniform Resource Locators (URLs). The predefined set of client requests represent a set of resources which the user of the client computer 120 has predefined and communication with this resource should be controlled by the hardware device 130. As an example, the user of the client computer 120 could define the URL of his bank as a predefined request in the proxy application 420. Then the proxy application 420 would observe whether the user enters the corresponding URL of this bank in the browser application 410. In other words, the proxy application 420 observes whether the user sends a client request to access the predefined URL via the communication network 160 to the server computer 110. Upon detection of one of the predefined client requests the proxy application 420 switches to and initiates a secure mode of operation. In the secure mode of operation the proxy application 420 changes the data flow and routes client requests received from the browser application 410 to the hardware device 130. Furthermore, the proxy application 420 initiates the secure mode of operation by sending an appropriate signal such as a secure mode enable signal, to the hardware device 130. Then the hardware device 130 initiates and runs a first communication protocol with encrypted data transmission and mutual authentication between the server computer 110 and the hardware device 130. Here, the hardware device 130 works as an intelligent interface between the server computer 110 and the browser application 410 of the client computer 120. In other words, the hardware device 130 controls and observes the data communication between the server computer 110 and the browser application 410. In the secure mode of operation the proxy application 420 operates as a kind of switch. On the one hand the proxy application 420 forwards, in the secure mode of operation, client requests received from the hardware device 130 to the communication network 160 and server responses received from the communication network 160 to the hardware device 130. On the other hand the proxy application 420 forwards, in the secure mode of operation, client requests received from the browser application 410 to the hardware device 130 and server responses received from the hardware device 130 to the browser application 410.

After the first communication protocol has been established, the hardware device 130 parses client requests received from the client computer 120 or from the browser application 410 respectively for predefined transaction information. In other words, the hardware device 130 observes whether the data traffic it receives from the client computer 120 contains any predefined transaction information. Examples of predefined transaction information can be security sensitive information such as payment details, payment amounts, etc. For example, the predefined transaction information can be predefined by the owner of the respective URL or by the bank that the user wants to perform a transaction with. The predefined transaction information can be sent for example, by means of a HTTP post request. Upon detection of predefined transaction information the hardware device 130 interrupts the corresponding client request and displays the detected predefined transaction information on the hardware device display 210 of the hardware device 130. The user that wants to perform the transaction can then check on the hardware device display 210 whether the respective transaction information is correct. As an example, if the predefined transaction information relates to the transfer amount of an electronic payment, the hardware device 130 would display on the hardware device display 210 the respective transfer amount. The user can check if the transfer amount is correct on the hardware device display 210. The hardware device 130 only continues with the transaction if the user confirms the transaction via the hardware device input unit 280, for example by pressing a confirmation button. If the hardware device 130 receives such a confirmation, it continues with the transaction and forwards the transaction information via the proxy application 420 and the communication network 160 to the server computer 110. If the hardware device 130 receives no confirmation or a cancellation signal, it cancels the transaction and does not forward the transaction information to the proxy application 420.

Preferably, the hardware device 130 sends, upon detection of predefined transaction information, an interruption message, also denoted as confirmation request message, back to the browser application 410. Such an interruption message can indicate to the browser application 410 that the hardware device 130 has identified predefined transaction information and is waiting for a user confirmation before continuing with the transaction. The browser application 410 preferably displays a corresponding interruption message, also denoted as confirmation request message, to the user on the client computer display 121. Such an interruption message could, for example, inform the user that he should double-check on the hardware device display 210 whether the transaction information is correct and that he should confirm this via the hardware device input unit 280.

The hardware device 130 includes a parsing program for parsing the client requests. The parsing program includes the predefined transaction information and can be application-specific. For example, banks could issue a bank-specific hardware device 130 on which a bank-specific parsing program is loaded. The respective bank could adapt the parsing program to its specific online banking process and its specific security needs and requirements. Preferably the parsing program is initialized in a trusted and secure environment, for example on a secure site of the bank. The parsing program is preferably loaded and stored in the security token 310 or the smart card 260 of the hardware device 130. However, according to another embodiment of the invention the parsing program could be stored in the storage 230 of the hardware device 130.

According to an embodiment of the invention the hardware device 130 parses server responses received from the server computer 110 for predefined transaction information. In other words, in addition to parsing the client request, the hardware device 130 also parses the server responses for predefined transaction information. The parsing process performed by the hardware device 130 for client requests and server responses is indicated in FIG. 4 by means of the dotted lines. FIGS. 5, 6, 7 and 8 show a schematic illustration of a message flow of a method according to an embodiment of the invention. There, the message flow between the server computer 110, the proxy application 420, the browser application 410 and the hardware device 130 is depicted with labeled arrows to which respective reference numbers are assigned. Further steps or sub-steps are indicated by reference numbers in a circle. The flow is understood as being performed sequentially from top to bottom as indicated by the increasing reference numbers.

An embodiment of the invention can include a proxy application which is adapted to parse client requests for a predefined set of client requests and initiate the secure mode of operation upon detection of a predefined client request. This is an efficient way of triggering the secure mode in an automated way. The user does not need to actively start the secure mode, but can be sure that whenever he sends one of the predefined client request, the secure mode will be started automatically.

An embodiment of the invention can include a secure mode which is initiated by sending a secure mode enable-signal from the proxy application to the hardware device. The secure-mode enable signal indicates to the hardware device that it shall start the secure mode.

An embodiment of the invention related to a computer program embodies the proxy application and establishes an efficient and flexible interface between a browser application and the hardware device. Such a computer program makes browser applications interoperable with the hardware device in an efficient way.

An embodiment of the invention can include a computer program which further includes instructions for carrying out the following steps when the computer program is executed on a client computer parsing client requests for a predefined set of client requests and initiating the secure mode upon detection of a predefined client request.

Figure 5:
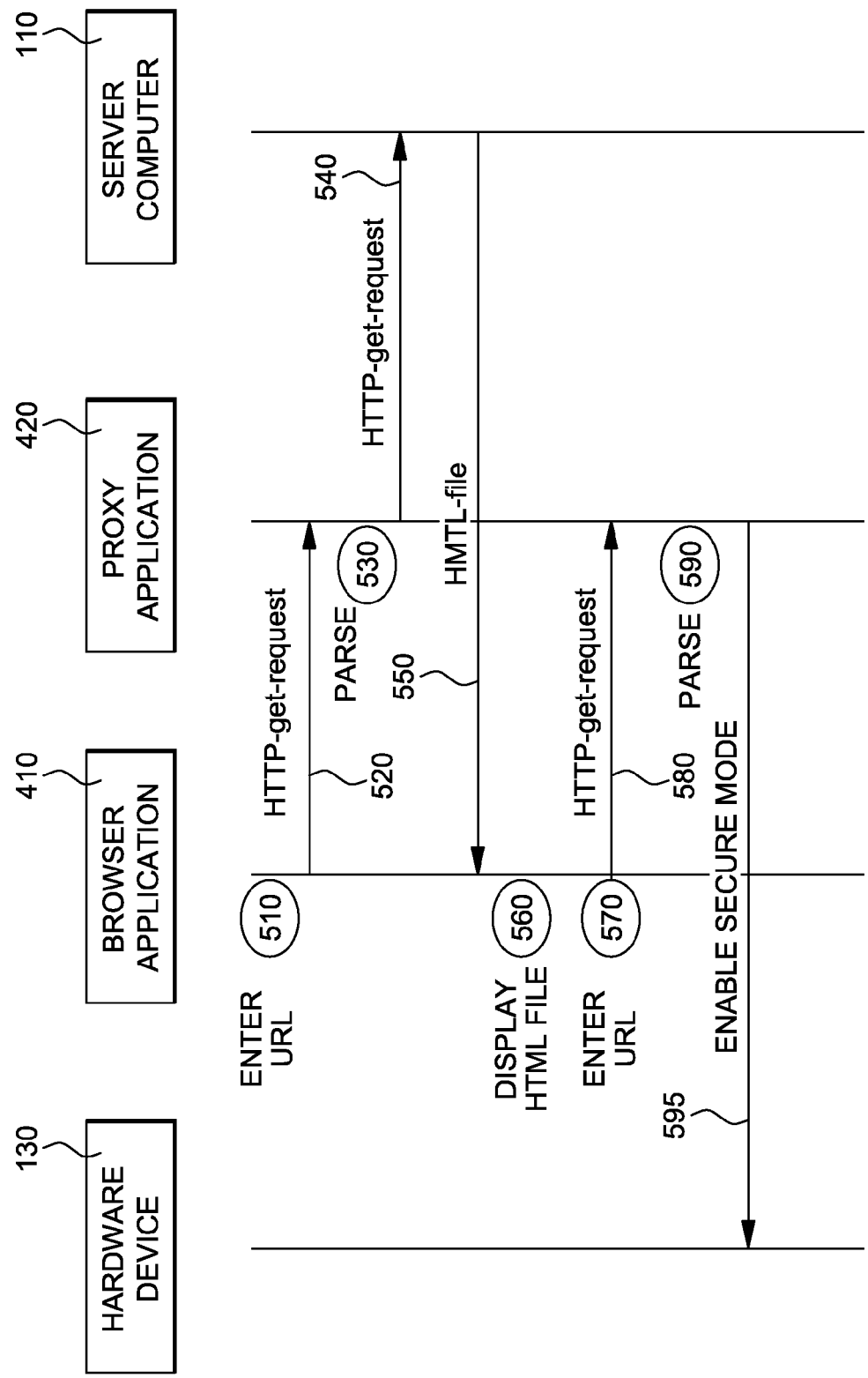
FIG. 5 shows a schematic illustration of a message flow of a method according to an embodiment of the invention in a normal mode of operation.

FIG. 5 illustrates the message flow in a normal mode of operation.

This embodiment of the invention relates to a method in which the server responses are parsed, but not the client requests. For example, the predefined transaction information of the server responses can be server challenges to the user or security sensitive information from the server computer to the user.

As an example, such a method could be used to perform a downloading of software with enhanced security. Before the hardware device forwards the software to the client computer, the hardware device can display a message in which the user is asked whether he agrees with the downloading. Furthermore, the server could send some user verifiable information with respect to the integrity of the software to the hardware device. Then the hardware device would display the user verifiable information on the hardware device display and the user could verify the integrity of the software before downloading it. This is particularly useful to avoid downloading malicious software.

An embodiment of the invention can include the step displaying the decrypted server responses on a client computer display of the client computer.

An embodiment of the invention can include the steps of running in a normal mode of operation a second communication protocol between a browser application of the client computer and the server computer via a proxy application of the client computer, running in a secure mode of operation the first communication protocol between the server computer and the hardware device, routing in the secure mode of operation client requests from the browser application via the proxy application to the hardware device and from the hardware device via the proxy application to the server computer, routing in the secure mode of operation server responses from the server computer via the proxy application to the hardware device and from the hardware device via the proxy application to the browser application.

The proxy application can be implemented as a computer program running on the client computer and allows for an efficient implementation of the method. It performs the function of a switch that is functionally arranged between the hardware device, the browser application and the server computer. In the normal mode of operation the proxy application forwards or routes respectively client requests directly from the browser application to the server computer via the communication network. In the other direction, server responses are sent via the communication network to the proxy application and forwarded directly from the proxy application to the browser application.

In the normal mode of operation the user preferably does not exchange security sensitive information with the server computer. In the normal mode of operation the hardware device can be switched off or unplugged.

If during his browsing session the user wants to perform an electronic transaction which can involve the exchange of security sensitive information, the secure mode of operation is invoked. According to this embodiment of the invention, in the secure mode the first communication protocol is run between the server computer and the hardware device via the proxy application and the communication network. Furthermore, the communication between the browser application and the hardware device is performed via the proxy application.

An embodiment of the invention can include the steps of parsing client requests for a predefined set of client requests by the proxy application and initiating the secure mode of operation by the proxy application upon detection of a predefined client request.

This is an efficient method to invoke the secure mode of operation in an automated way. The proxy application can automatically initiate the secure mode of operation without any user interaction. As an example, the predefined set of client requests can include a predefined set of Uniform Resource Identifiers (URI) or Uniform Resource Locators (URL) that identify resources of a server computer. For example, such resources can be one or more URLs of banks where the user has an account and/or one or more electronic commerce entities with whom the user wants to perform e-commerce or any entity with whom the user wants to perform electronic transactions. If the user types in one of these predefined URLs or URIs in his browser application, the proxy application detects it and initiates the secure mode of operation. The secure mode of operation can be initiated for example, by means of sending an "initiate secure mode" signal to the hardware device.

The secure mode could be invoked manually by the user, e.g. by connecting the secure hardware device with the client computer.

An embodiment of the invention can include, before forwarding the decrypted server responses from the hardware device to the client computer, the steps of parsing the server responses for predefined transaction information by the hardware device, forwarding server responses that do not contain any predefined transaction information to the client computer by the hardware device, displaying the predefined transaction information upon detection in a server response on the hardware device display of the hardware device, forwarding the server response containing the predefined transaction information to the client computer if a user confirmation is received, canceling the electronic transaction if no user confirmation is received.

Parsing the server responses in addition to parsing the client requests provides enhanced functionality and applications. The predefined transaction information of server responses can be displayed on the hardware device display for the attention of the user. For example, the predefined transaction information of the server responses can include warning messages of the server computer which could be displayed on the hardware device display. Furthermore, the predefined transaction information of the server responses can be server challenges to the user or any other security sensitive information from the server computer to the user. This has the advantage of allowing a user to check such predefined transaction information of the server even if malicious software running on the client computer prevents the predefined transaction information from being displayed on the client computer display or if the malicious software manipulates the view on the client computer display.

An embodiment of the invention can have a first communication protocol which includes a network layer including a protocol according to the Secure Sockets Layer (SSL)-standard or according to the Transport Layer Security (TLS)-standard and a protocol according to the Transmission Control Protocol/Internet Protocol (TCP/IP)-standard.

These protocols are broadly applicable and widespread. The method according to this embodiment of the invention can use these protocols without any need for adaptation. This allows implementing the method according to this embodiment of the invention in a cost efficient way. The SSL or TLS layer runs above the TCP/IP-layer and provides the functionality of server authentication, client authentication as well as encrypted data transmission.

An embodiment of the invention can have a first communication protocol which includes an application layer including the Hyper Text Transfer Protocol (HTTP).

This protocol is broadly applicable and widespread. In combination with a SSL or TLS protocol on the network layer the Hyper Text Transfer Protocol Secure (HTTPS) can preferably be established.

An embodiment of the invention can have a second communication protocol which includes a network layer including the Transmission Control Protocol/Internet Protocol (TCP/IP) and an application layer including the Hyper Text Transfer Protocol (HTTP).

These protocols are broadly applicable and widespread. In the normal mode of operation a user of the client computer could browse the internet by means of the browser application using TCP/IP and HTTP.

An embodiment of the invention can include the step of performing a user authentication by the server computer.

This additional authentication enhances the security of the method. For example, a user authentication might be performed by means of a password or a personal identification number (PIN) of the user. The server can send a server response to the client computer in which the user is asked to enter his password or PIN. The password or PIN is stored at the server computer and can be checked by the server computer. A user authentication is understood as an authentication that cannot be automatically performed by the hardware device itself, but needs additional input from the user of the system. This prevents an adversary from misusing a stolen hardware device without knowing the additional Password or PIN. On the contrary, the mutual authentication between the hardware device and the server computer that is performed during the first communication protocol can be performed automatically without further user interaction. The user authentication should preferably be performed before any predefined transaction information is sent from the secure hardware device to the server computer.

An embodiment of the invention can include step of performing a user authentication by the hardware device.

This additional authentication enhances the security of the method. For example, a user authentication might be performed by means of a password or a personal identification number (PIN). As an example, the hardware device could display a message in which the user is asked to enter his password or PIN by means of the hardware device input unit. The password or PIN is stored in the hardware device or on a smartcard readable by the hardware device and can be checked by the hardware device. This prevents an adversary from misusing a stolen hardware device without knowing the additional Password or PIN. Other user authentication methods like biometric authentication can be used as well, for example fingerprint reading. In this embodiment the user authentication should preferably be performed before starting or establishing respectively the first communication protocol.

This embodiment of the invention relates to a method in which the server responses are parsed, but not the client requests. For example, the predefined transaction information of the server responses can be server challenges to the user or security sensitive information from the server computer to the user.

As an example, such a method could be used to perform a downloading of software with enhanced security. Before the hardware device forwards the software to the client computer, the hardware device can display a message in which the user is asked whether he agrees with the downloading. Furthermore, the server could send some user verifiable information with respect to the integrity of the software to the hardware device. Then the hardware device would display the user verifiable information on the hardware device display and the user could verify the integrity of the software before downloading it. This is particularly useful to avoid downloading malicious software.

In a step 510 the user of the client computer 120 enters a client request, for example a URL of a website, by means of the client computer input unit 122. In step 520 the browser application 410 sends the client request, for example a HTTP get request including the URL of a website, to the proxy application 420. In step 530 the proxy application 420 parses the client request for a predefined set of requests, for example for a predefined set of URLs. In this example it is assumed that the client request sent in step 520 does not belong or correspond to the predefined set of client requests. Accordingly, the proxy application 420 forwards the client request in step 540 via the communication network 160 to the server computer 110. In step 550 the server computer 110 answers by sending back a server response, for example a HTTP-server response including a HTML-file of the requested URL. Then in step 560 the server response, for example the HTML-file of the requested URL, is displayed on the client computer display 121.

Steps 510, 520, 530, 540, 550 and 560 represent a normal mode of operation of the browser application 410 and the proxy application 420. The normal mode of operation can be performed without the hardware device 130. In the normal mode of operation a second communication protocol is run between the browser application 410 and the server computer 110.

In a step 570 the user of the client computer 120 enters another client request, for example a URL of a website, through the client computer input unit 122. In step 580 the browser application 410 sends a corresponding client request to the proxy application 420. In this example it is assumed that the client request sent in step 580 belongs or corresponds to the predefined set of client requests. As an example, the client request sent in step 580 might be a HTTP get request for a URL that belongs to the predefined set of URLs. This might be for example the URL of the website of the bank of the user. In a step 590 the proxy application 420 parses the client request for the predefined set of requests and detects that the client request sent in step 580 belongs or corresponds to the predefined set of client requests. Accordingly, the proxy application 420 switches to a secure mode of operation and initiates in step 595 the secure mode of operation in the hardware device 130 by sending a secure mode enable signal to the hardware device 130. The secure mode enable signal could be, for example implemented as a "initiate secure mode"—command that is understood by the hardware device 130. The secure mode enable signal indicates to the hardware device 130 that it shall start the secure mode of operation for the subsequent communication between the browser application 410 and the server computer 110.

Figure 6:
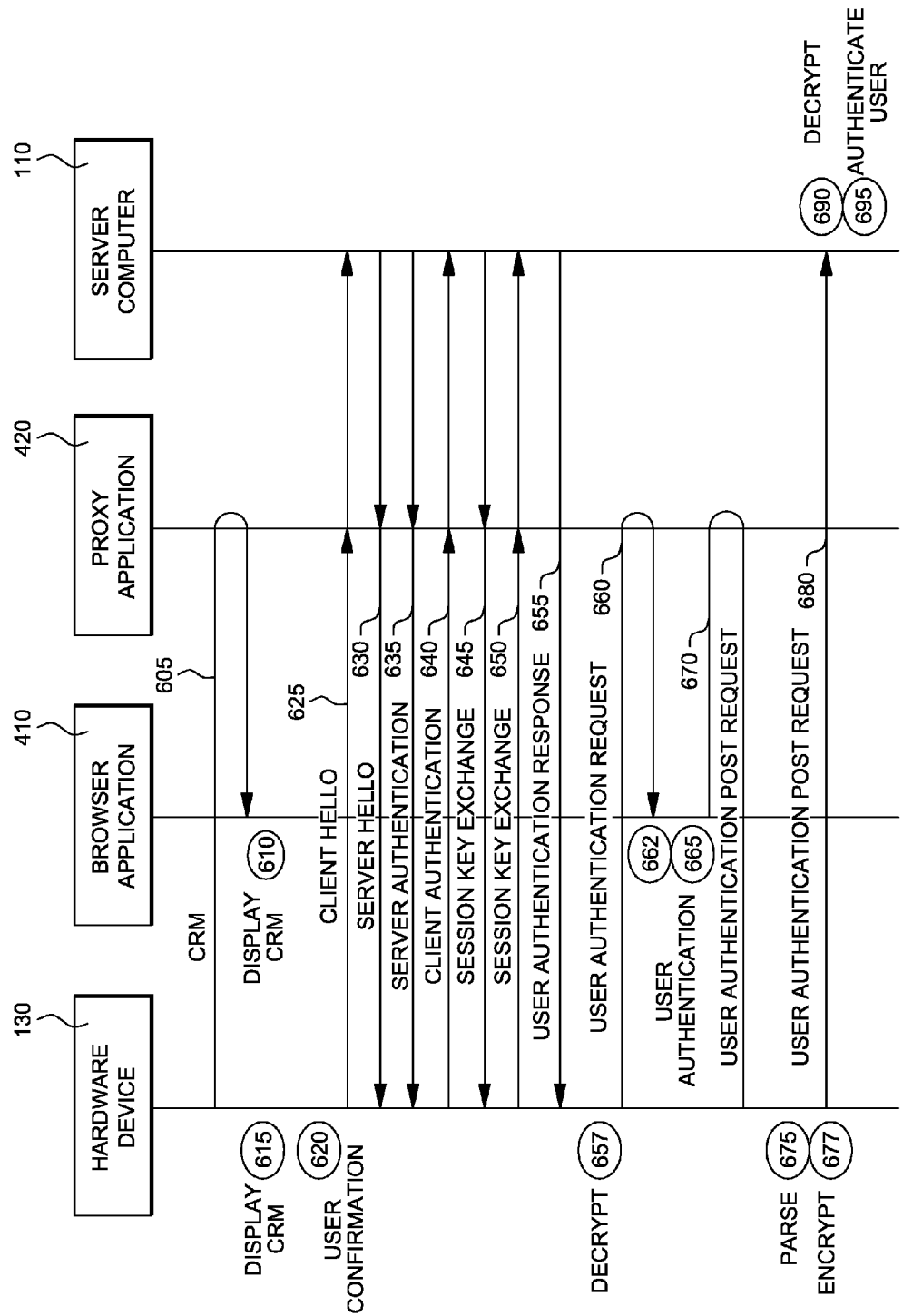
FIG. 6 to FIG. 9 show schematic illustrations of message flows of a method according to an embodiment of the invention in a secure mode of operation.
Figure 7:
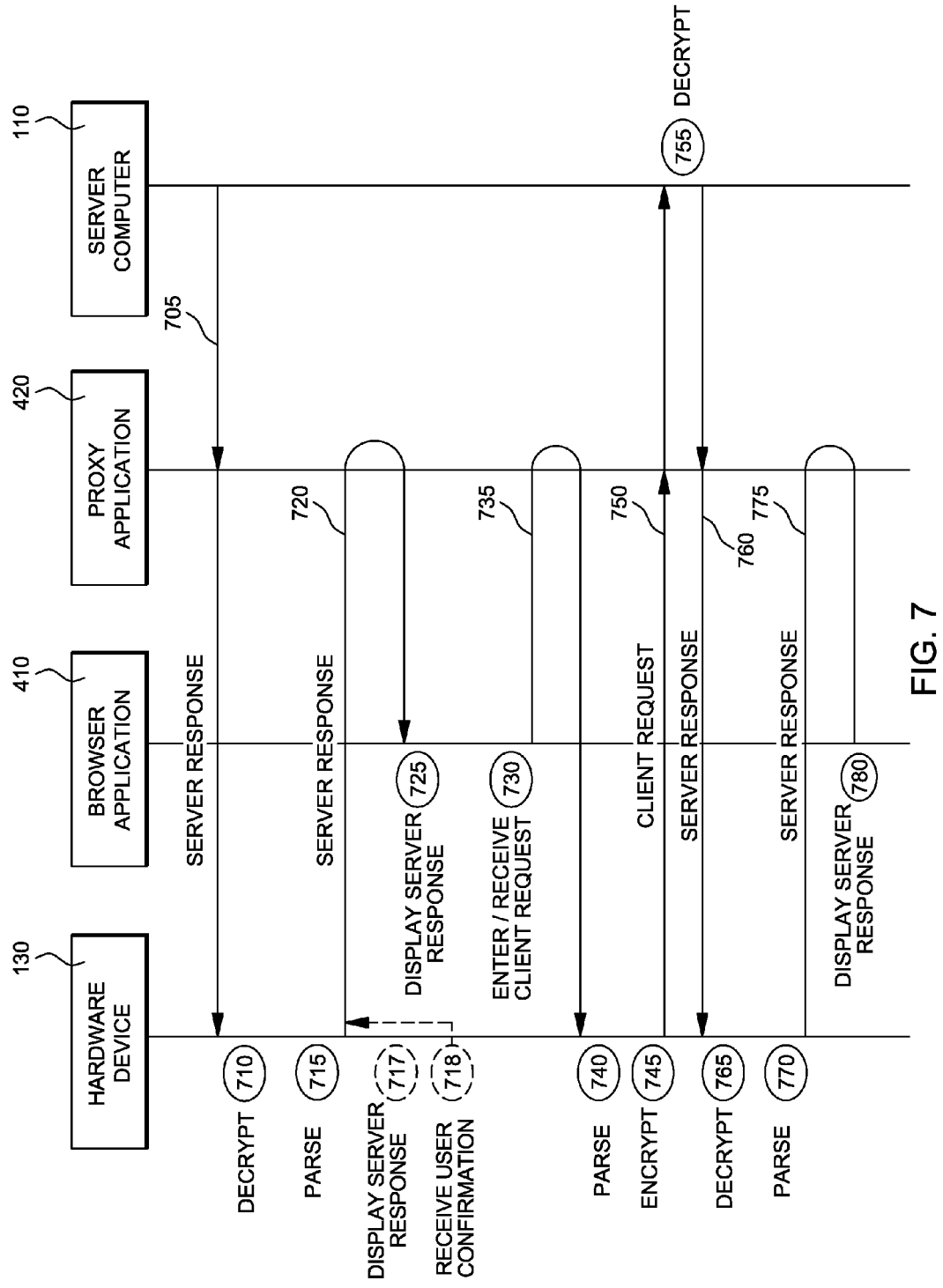
Figure 8:
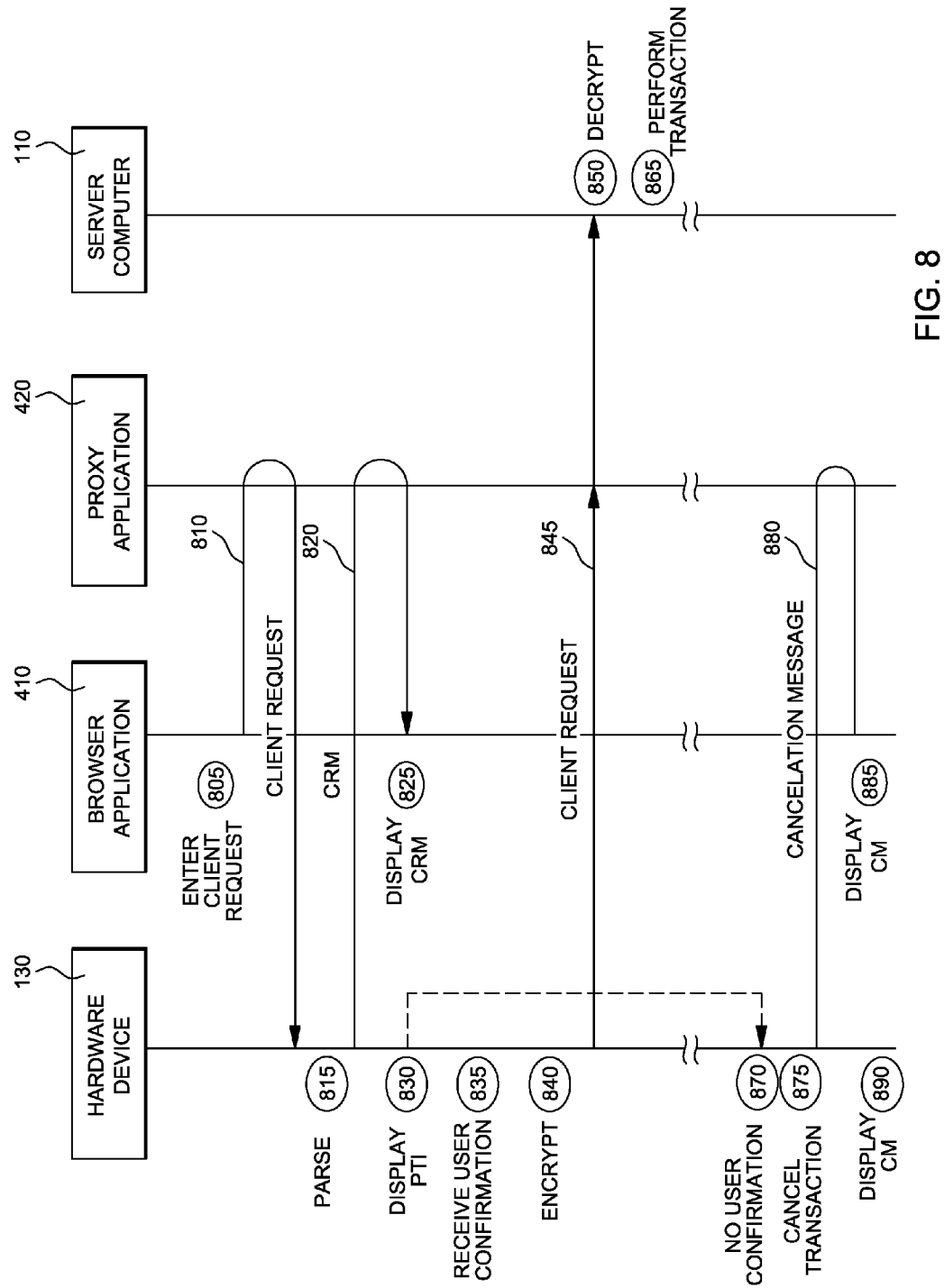

With reference to FIGS. 6, 7 and 8 the message flow in the secure mode of operation is illustrated.

In FIG. 6, after having received the secure mode enable signal in step 595, the hardware device 130 sends in step 605 a confirmation request message (CRM) via the proxy application 420 to the browser application 410. Then in step 610 the browser application 410 displays the confirmation request message to the user on the client computer display 121. The confirmation request message asks the user to confirm that the secure mode of operation shall be performed. It could for example read as follows: "The website you requested requires the initialization of a secure mode of operation. Please confirm that you agree by means of pressing the confirm button of your hardware device". In step 615 a corresponding message, in particular in a shortened form such as "Confirm secure mode?" is displayed on the hardware device display 210 of the hardware device 130. The confirmation response of the user can be received in step 620 via the hardware device input unit 280.

Upon confirmation of the user in step 620 the hardware device 130 sends in step 625 a hello message via the proxy application 420 and the communication network 160 to the server computer 110. In step 630 the server computer 110 sends a hello message back via the communication network 160 and the proxy application 420 to the hardware device 130. In step 635 the server computer 110 authenticates itself to the hardware device 130. This can include sending a server certificate (public key certificate) to the hardware device 130. In addition, it can include a certificate request for a client certificate. In step 640 the client computer 120 authenticates itself to the server computer 110. This can include sending a client certificate (public key certificate) to the server computer 110. In summary, the server computer 110 and the hardware device 130 perform in the steps 635 and 640 a mutual authentication.

In steps 645 and 650 the server computer 110 and the hardware device 130 exchange a symmetric cryptographic key SK, also denoted as session key.

Steps 625-650 can be, for example, implemented by means of the SSL/TLS handshake protocol.

In the following, the data transmission between the hardware device 130 and the server computer 110 is performed in an encrypted way by means of the session key SK. This can be, for example, implemented by means of the SSL/TLS record protocol.

In step 655 the server computer 110 sends a user authentication response to the hardware device 130. Such a user authentication response could, for example include a HTML-form with a user field and a password field in which the user shall enter his name and his password.

The user authentication response is decrypted in step 657 by the hardware device 130 and then forwarded in a step 660 via the proxy application 420 to the browser application 410. In step 662 the user authentication response is displayed on the client computer display 121. In step 665 the user enters his personal authentication data, for example his user name and his password, into the corresponding HTML-form by means of the client computer input unit 122. Then in step 670 the browser application 410 sends a HTTP post request including the authentication data of the user to the hardware device 130. In step 675 the hardware device parses the HTTP post request for predefined transaction information. In this example it is assumed that a HTTP post request including information for user authentication is not predefined transaction information. Accordingly in step 677 the HTTP post request is encrypted by using the symmetric session key SK and sent in step 680 to the server computer 110. The server computer 110 decrypts the HTTP post request in step 690 by means of the symmetric session key SK and, if the user authentication data is valid, authenticates the user in step 695. Otherwise the server computer 110 can cancel the transaction.

Steps 655 to 695 illustrate an additional user authentication by the server computer 110 which can be implemented to enhance the security in case that the hardware device 130 is stolen or lost. According to another exemplary embodiment the additional user authentication described with reference to steps 655 to 695 is replaced by a user authentication performed by the hardware device 130.

The illustration of the message flow in the secure mode of operation after the user authentication is continued with reference to FIG. 7.

In step 705 the server computer 110 sends as server response a transaction response via the proxy application 420 to the hardware device 130. Such a transaction response could, for example, include a HTML-file with bank account data of the user that has been authenticated in the previous steps. In a step 710 the hardware device 130 decrypts the server response by using the symmetric session key SK. In step 715 the hardware device 130 can parse the server response for predefined transaction information. In this example it is assumed that server response received in step 705 does not include predefined transaction information. Then in step 720 the decrypted server response is sent from the hardware device 130 via the proxy application 420 to the browser application 410. In step 725 the browser application 410 displays the server response on the client computer display 121 of the client computer 120.

According to another example as illustrated with dotted lines it is assumed that the server response received in step 705 does include predefined transaction information. Then the hardware device 130 detects in the parsing step 715 that the server response contains predefined transaction information. Accordingly, the hardware device 130 displays in step 717 the predefined transaction information of the server response on the hardware device display 210. If the user confirms in a step 718 the transaction information of the server response displayed on the hardware device display 210 by using the hardware device input unit 280, the method is continued with step 720. If the user does not confirm the transaction information of the server response, the hardware device 130 cancels the transaction.

In step 730 the user enters a client request that does not include predefined transaction information. This could be, for example, a client request to get specific data of the bank account of the user, to show more details of the bank account or to perform an initial check of a planned electronic transaction like a money transfer. In step 735 the browser application 410 sends the client request via the proxy application 420 to the hardware device 130. In step 740 the hardware device 130 parses the received client request for predefined transaction information and detects that the client request does not include predefined transaction information. Then in step 745 the hardware device 130 encrypts the client request by means of the symmetric session key SK and sends the encrypted client request in step 750 to the proxy application 420. The proxy application 420 forwards the encrypted client request in the step 750 via the communication network 160 to the server computer 110. In step 755, the server computer 110 decrypts the received encrypted client request by using the symmetric session key SK and processes the decrypted client request.

In step 760 the server computer 110 sends a server response with respect to the received client request via the proxy application 420 back to the hardware device 130. In a step 765 the hardware device 130 decrypts the server response by using the symmetric session key SK. In step 770 the hardware device 130 can parse the server response for predefined transaction information. In this example it is assumed that server response received in step 760 does not include predefined transaction information. Accordingly, in step 775 the decrypted server response is sent from the hardware device 130 via the proxy application 420 to the browser application 410 and in step 780 the browser application 410 displays the server response on the client computer display 121 of the client computer 120.

FIG. 8 illustrates the message flow in the secure mode of operation for a client request that includes predefined transaction information.

In step 805 the user enters a client request that includes predefined transaction information. An example of the predefined transaction information can be a final order to perform an electronic transaction. Such a final order can be, for example, a money transfer order with payment details such as the amount of the money transfer. The predefined transaction information can be, for example, entered by the user in a corresponding HTML-form by means of the client computer input unit 122. In step 810 the browser application 410 sends a client request including the predefined transaction information via the proxy application 420 to the hardware device 130. This could be, for example, a HTTP-post request. In step 815 the hardware device 130 parses the received client request for predefined transaction information and detects if the client request includes predefined transaction information, for example, the above mentioned final payment details of a money transfer. Then in step 820 the hardware device 130 sends a confirmation request message (CRM) via the proxy application 420 to the browser application 410. The browser application 410 displays in step 825 the confirmation request message on the client computer display 121 of the client computer 120. The confirmation request message indicates to the user that the hardware device 130 has detected predefined transaction information and that the user should check and confirm the correctness of the transaction information on the hardware device display 210 of the hardware device 130. An example of the confirmation request message could read as follows: "Please check the transfer amount on the display of your security token. If the transfer amount is correct, confirm the transaction by pressing the confirm button of the security token".

In step 830 the hardware device 130 displays on the hardware device display 210 the predefined transaction information (PTI), for example, the amount of money to be transferred and the destination account. In addition a confirmation message could be displayed on the hardware device display 210 as well. As the hardware device display 210 might be rather small, the confirmation message is preferably rather short like "Please confirm transfer of amount X to account Y". The user can then check on the hardware device display 210 whether the transaction information is correct. In addition, he can compare the transaction information displayed on the hardware device display 210 with the transaction information displayed on the client computer display 121. If the user confirms in a confirmation step 835 that the transaction information displayed on the hardware device display 210 is correct, for example, by pressing a confirmation button of the hardware device input unit 280, the transaction will be continued. Then in step 840 the hardware device 130 encrypts the client request including the transaction information by using the symmetric session key SK and sends the encrypted client request in step 845 to the proxy application 420. The proxy application 420 forwards the encrypted client request through the communication network 160 to the server computer 110. The server computer 110 decrypts in step 850 the received encrypted client request by using the symmetric session key SK. Then in step 855 the server computer 110 performs the transaction. In the example of money transfer the server computer 110 would transfer in step 855 the money to the destination account.

If the user does not confirm that the transaction information displayed on the hardware device display 210 is correct, the method is continued with step 870. This is indicated by the dotted line. The non-confirmation of the transaction can be invoked actively by the user, for example, by pressing a cancel-button of the hardware device input unit 280 or passively, for example, if the hardware device 130 does not receive a confirmation within a predefined timeout period. Then in step 875 the hardware device 130 cancels the transaction and does not forward the transaction information to the server computer 110. In addition, in step 880 the hardware device 130 might send a cancellation message (CM) through the proxy application 420 to the browser application 410. The browser application 410 displays in step 885 the cancellation message on the client computer display 121 of the client computer 120. The cancellation message indicates to the user that the hardware device 130 has cancelled the transaction. For example, the cancellation message could read as follows: "The transaction has been cancelled due to non-confirmation. If you have observed a discrepancy between the transaction information you entered via the keyboard of your PC and the transaction information displayed on the display of your security token, your PC might be compromised by malicious software". In addition, the cancellation message could be displayed in step 890 on the hardware device display 210 as well.

Figure 9:
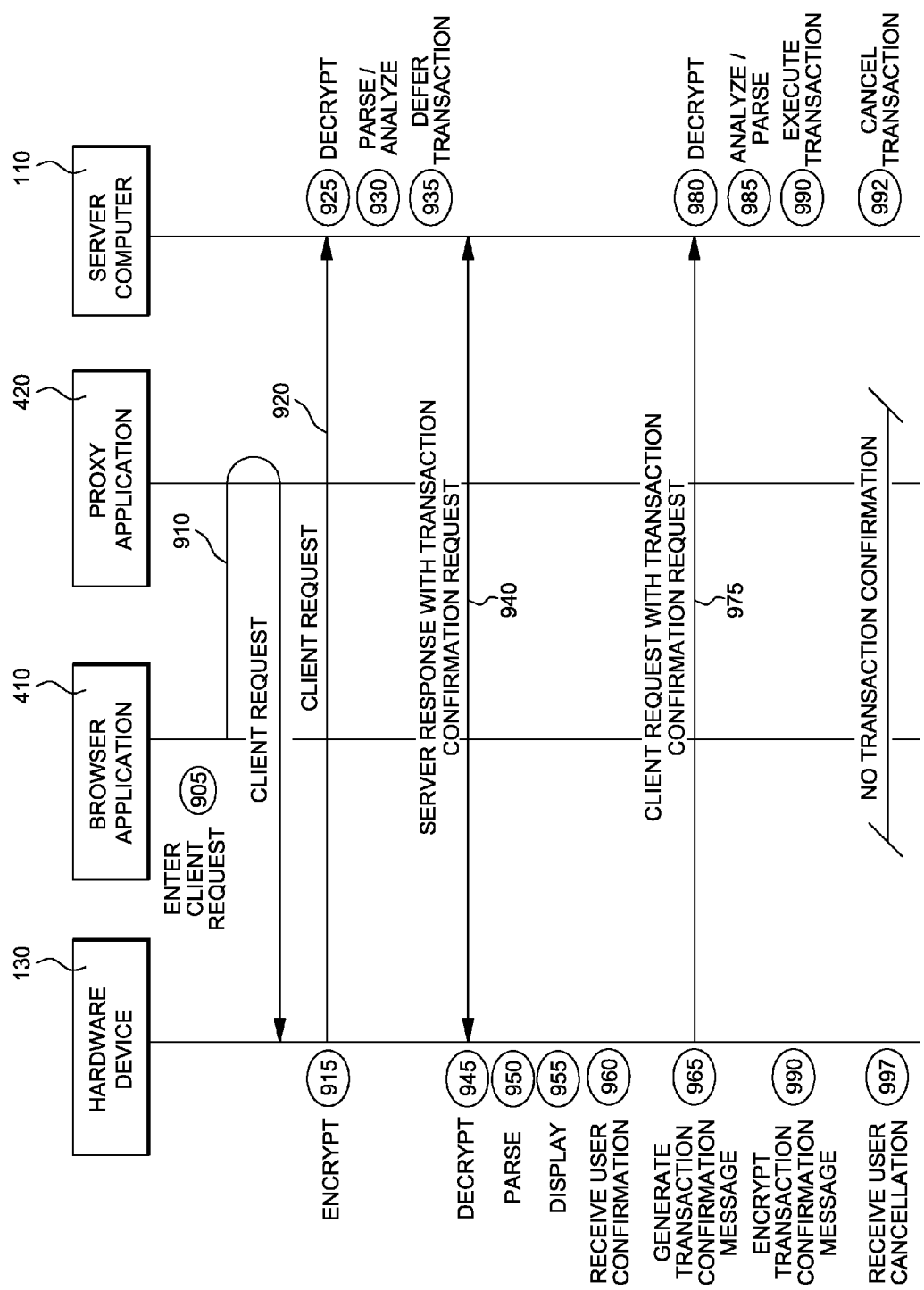

FIG. 9 illustrates the message flow according to another embodiment of the invention.

In step 905 the user enters a client request that does comprise predefined transaction information. The predefined transaction information may be e.g. a final order to perform an electronic transaction. Such a final order may be e.g. a money transfer order with payment details such as the amount of the money transfer. The predefined transaction information may be e.g. entered by the user in a corresponding HTML-form by means of the client computer input unit 122. In step 910 the browser application 410 sends a client request comprising the predefined transaction information via the proxy application 420 to the hardware device 130. This could be e.g. a HTTP-post request. According to this embodiment of the invention the hardware device may not parse the client requests for predefined transaction information, but may just encrypt in step 915 the client request comprising the transaction information by means of the symmetric session key SK of the already established SSL connection and send the encrypted client request in step 920 to the proxy application 420. The proxy application 420 forwards the encrypted client request via the communication network 160 to the server computer 110. The server computer 110 decrypts in step 925 the received encrypted client request by the symmetric session key SK. Then in step 930 the server computer 110 scans or parses the client request for predefined transaction information. In this example the server computer 110 detects that the client request asks for a money transfer to another bank account. Such information has been predefined by the operator of the server computer 110, e.g. by the bank, as predefined transaction information that should be double-checked by the server computer 110 before executing the transaction. Accordingly, in step 935 the server computer 110 does not execute the requested transaction, but defers it. In step 940 the server computer 110 sends a transaction confirmation request embedded in a server response to the hardware device 130 via the first communication protocol, e.g. by the mutually authenticated SSL/TLS session. According to an embodiment of the invention the transaction confirmation request is located or placed in a header of the first communication protocol, e.g. as HTTP header. The transaction confirmation request may e.g.

comprise the essential information about the requested transaction, e.g. the amount of money and the destination transfer account. In addition, the transaction confirmation request may comprise a transaction specific challenge for which the server computer might expect to receive a cryptographic response if the user has approved the transaction.

In step 945 the hardware device 130 decrypts the server response in accordance with the SSL/TLS protocol and detects in step 950 by parsing or scanning or observing respectively that the server response comprises a transaction confirmation request that should be displayed as predefined transaction information by the hardware device 130. According to an embodiment of the invention the hardware device is configured to scan/parse (only) the headers/header files of messages received in accordance with the first communication protocol. This reduces the computational effort in the hardware device. According to an embodiment of the invention the hardware device 130 presents in step 955 the transaction confirmation request to the user, e.g. on its display. The user can double-check and verify whether the transaction confirmation request presented by the hardware device 130 comprises the correct information. If the transaction confirmation request is correct, the user may confirm the request, e.g. by pressing an OK button of the input unit 280 of the hardware device 130. In step 960 the hardware device 130 receives the user confirmation. In step 965 the hardware device generates a transaction confirmation message and embeds it into a client request. According to an embodiment of the invention this may include performing a signature of the transaction confirmation request by means of a signature key stored within the hardware device or by means of a smart card available in a smart card slot. Alternatively, it may include calculating a cryptogram for a given challenge included in the transaction confirmation request by means of a symmetric key stored within the hardware device or by means of a smart card available in a smart card slot. According to other embodiments of the invention this may just include copying or replicating the data of the transaction confirmation request in the transaction confirmation message.

In step 970 the hardware device 130 encrypts the transaction confirmation message and in step 975 the encrypted transaction confirmation message is sent the server computer 110. In step 980 the server computer 110 decrypts the transaction confirmation message. In step 985 the server computer 110 analyses/parses the transaction confirmation message. Then in step 990 the server computer 110 executes the deferred transaction. In the example of money transfer the server computer 110 would transfer in step 990 the money to the destination account.

If the user observes in step 955 that the transaction confirmation request presented by the hardware device 130 does comprises false information, she can cancel the transaction, e.g. by pressing a Cancel button of the hardware device 130. In this case the hardware device 130 receives in step 991 a user cancellation and accordingly the hardware device 130 cancels the transaction and does not send back a transaction confirmation message to the server computer 110. Alternatively the hardware device 130 may generate and send an explicit transaction cancellation message to the server computer 110. As the server computer 110 does not receive a transaction confirmation message, it cancels in step 992 the deferred transaction.

According to further embodiments of the invention the hardware device 130 may after step 950 save the transaction confirmation request received from the server computer 110, e.g. in its internal memory 220. This is illustrated with reference to FIG. 13 in step 951. According to embodiments of the invention the hardware device 130 may forward the server response comprising the transaction confirmation request to the proxy application 420. According to further embodiments of the invention the hardware device 130 may forward the server response comprising the transaction confirmation request to the browser application 410 and display the server response on the display 121 of the client computer 120. This is illustrated with reference to FIG. 13 in steps 952 and 953. According to embodiments of the invention, when the next client request, received from the browser 410 or proxy application 420, or generated by the hardware device 130 itself, is to be sent to the server computer 110, the hardware device 130 may retrieve the transaction confirmation request previously stored to its internal memory 220 and present it to the user, e.g. by its display 210. This is illustrated with reference to FIG. 13 in steps 954 and 955. Upon user confirmation the client request with the embedded transaction confirmation message is sent from the hardware device 130 to the server computer 110 as described above with reference to FIG. 9.

The hardware device according to embodiments of the invention adds a trusted and tamper-resistant secure communication endpoint to an untrustworthy client computer. Through this secure communication endpoint a user can securely communicate with sensitive online services such as a banking server.

According to embodiments of the invention all or a part of the communication between the user and the server is passed through and processed by the hardware device which in turn may be hooked into the communication path by a proxy application running on the client computer. When in use, the hardware device according to embodiments of the invention may continuously scan data exchanged between client computer and server computer for sensitive operations such as bank transfers. For each sensitive operation, the hardware device may according to embodiments of the invention intercept the communication flow, extract crucial information for display and verification, and may proceed only after the user has confirmed the operation by pressing e.g. an "OK" button or key on the hardware device 130. Non-sensitive operations may be just passed along without user interaction. Furthermore, hardware devices according to embodiments of the invention may serve as a holder for sensitive personal information, such as a private key for use in SSL/TLS client authentication. Furthermore, hardware devices according to embodiments of the invention may utilize a smart card within the hardware device to protect private data from extraction and duplication. This facilitates non-repudiation of an authentication solution.

Hardware devices according to embodiments of the invention may comprise a processing unit, volatile and persistent memory, a display or projector device, control buttons (e.g. "OK," "Cancel", etc.), and a smart-card reader. Computer programs according to embodiments of the invention may be configured with a complete TLS engine. This TLS engine may include according to embodiments of the invention all cryptographic algorithms required by today's SSL/TLS servers, an HTTP parser for analyzing the data exchanged between the client and server and system software implementing a USB mass storage device (MSD) profile.

Furthermore, hardware devices according to embodiments of the invention may be pre-loaded with the aforementioned proxy application (networking proxy). This proxy may hook hardware devices according to embodiments of the invention into the client/server communication path. The proxy may merely send data to and receive responses back from the hardware devices by reading and writing a dedicated, virtual file on the drive of the hardware device. This approach may make hardware devices according to embodiments of the invention only dependent on standard USB MSD drivers which may be readily available on operating systems.

According to embodiments of the invention a computer program or computer readable article of manufacture tangibly embodying computer readable instructions is provided for carrying out the following steps:

forwarding client requests received from a browser application of the client computer to a hardware device and from the hardware device via a communication network to a server computer, forwarding server responses received from the server computer to the hardware device and from the hardware device to the browser application.

Furthermore, hardware devices according to embodiments of the invention may be configured with user credentials, one or more X.509 client and server certificates enabling TLS with client authentication, and a server-specific HTTP parsing profile that may configure a generic HTTP parser of the hardware device to selectively identify sensitive operations such as a money transfer from the communication stream. According to embodiments of the invention client authentication may be performed by means of other application level authentication protocols, e.g. by means of challenge-response protocols.

According to embodiments of the invention, a client/server interaction may involve the following steps:

A user plugs a hardware device according to embodiments of the invention into her (potentially insecure) client computer which may mount the hardware device e.g. as a USB mass storage device and may auto-start the proxy which may also reside on the hardware device. The proxy may automatically launch the user's default web browser and may connect to the pre-set server of choice.

The proxy in response may trigger the hardware device to initiate and run a TLS session handshake which may include mutual authentication. Hereby, the proxy may "blindly" relay all the communication exchanged between the hardware device and the server, that is, without being able to interpret the communication itself. Upon successful completion of the handshake, both client and server have been authenticated and a TLS session has been established between the hardware device and the server.

According to embodiments of the invention, from then on, all interactions/communications between the client computer and the server computer, still "blindly" relayed by the proxy, are scanned or parsed or observed by the hardware device for predefined transaction information such as sensitive operations. If found, the hardware device may send the user's operation request and transaction data only after explicit user consent has been given as described before. For instance, considering again a bank transfer, the hardware device may extract the transaction's crucial data such as the recipient's bank account information and the amount of money to transfer, may present this information to the user, e.g. by displaying it on a display of the hardware device and may await the user's explicit confirmation, e.g. via a press on its OK button before proceeding. If the user detects any manipulations in the transaction's crucial data, she can abort the transaction by pressing the Cancel button.

According to embodiments of the invention data from the server, e.g. confirmation data of a transaction, can also be dynamically extracted and shown on the display of the hardware device for user verification.

Hardware devices according to embodiments of the invention can make explicit what really is communicated between client and server. While malicious software may still passively read the transaction data exchanged, any modification can be disclosed by the hardware device.

According to further embodiments of the invention, the user credentials and the X.509 certificates for TLS mutual authentication are maintained securely on the hardware device, e.g., on an embedded smart card. Accordingly, no Man in the Middle and no malicious software can impersonate the hardware device, while the hardware device in turn can verify that it connects to a genuine server.

Since the proxy application may only implement a relay service, any attack on the proxy application may, at worst, just cease the service to work with no other harm done. While the proxy application according to embodiments of the invention may communicate with the hardware device in plain, the (user-confirmed) communication between the hardware device and the server may be protected by the TLS session ending on the hardware device, thus keeping Man in the Middle and malicious software locked out from modifying transaction data unnoticed.

According to further embodiments of the invention the hardware device and the server comprise parsers/analyzers that both scan all transaction data in exactly the same way. This ensures that the predefined transaction information presented by the hardware device is exactly the same as the one processed by the server.

According to embodiments of the invention the hardware device may require no manual software installation by the user and no manual server certificate checks.

According to embodiments of the invention the hardware device may be small enough to qualify for mobile usage, for instance, as a keychain "fob."

According to further embodiments of the invention a hardware device may be configured with multiple parsing profiles, user credentials, and X.509 certificates to allow secure communication with multiple servers from different service providers.

According to further embodiments of the invention hardware devices may be deployed that require no or small changes to the user authentication protocols already in place. According to further embodiments of the invention the user authentication may be completely handled by the hardware device, potentially supported by an embedded smart card and without any user interaction for added convenience. According to the latter embodiment the hardware device would preferably be PIN protected and manually "opened" (unlocked) by the user prior to connecting to the desired server.

According to further embodiments of the invention the proxy application may shuttle plaintext data back and forth between the hardware device and the browser.

According to further embodiments of the invention the proxy application provides an SSL-protected communication path to the web browser. This way, users are no longer required to "unlearn" that secure connections are indicated by a "key lock" symbol and the https://address indicator. In addition, the web browser is discouraged from caching the banking web pages as data received via SSL/TLS is typically subject to more stringent caching rules than data received via plain HTTP.

According to embodiments of the invention the hardware device 130 may be embodied as a pointer device. In the context of embodiments of the invention, the term "pointer device" or "computer pointer device" are synonymous and describe an input/output device that is operably associated with a client computer. Therefore, a pointer device may be operably associated with a client computer by a standard cable, such as a USB (Universal Serial Bus) cable, or it may be a wireless/cordless device that communicates with a computer's receiver by optical means (e.g., infrared) or by wave principle (e.g., radio waves). This technology is known with respect to the conventional computer mouse. However, the pointer device is not limited to a conventional mouse although the pointer device possesses the functionality of a conventional mouse—pointing, clicking and scrolling at points on the computer display dictated by the user.

Pointer devices according to embodiments of the invention may encompass various input devices. In one embodiment, the pointer device may be a combination of known components. For example a combination keyboard, mouse wherein the mouse component comprises a display means. Further, the combination keyboard and mouse may be either wireless/cordless or attached by cable. An additional embodiment of the pointer device resembles a trackball combined with the additional input elements and display means suitable for specifying the election of specific options.

All of the foregoing embodiments preferably have an integrated display means to allow the user to visualize security-sensitive information required for the transaction to proceed. The display may also provide alternative responses such as a means to elect a particular option, e.g., to continue, terminate or pause the transaction, as well as selecting or entering other types of transaction-related subject matter such as numbers or amounts, and the like. The size and nature of the display means can vary in distinct embodiments. For example, the display may comprise a screen, e.g., LED display, wherein information is displayed directly by the pointer device. Alternatively, the pointer device may project the security sensitive information from a laser or LED projector that produces the image on any suitable surface—the table or desk upon which the pointer device is set; a suitably placed piece of paper or other material.

In still an additional embodiment, the pointer device may comprise a digitizing pad for displaying the transactional information and an operably associated cursor or pen to input the user's elections. In such an embodiment, the conventional mouse function may be localized in an integrated tracking ball device having input keys, buttons or levers and the like, to enter responses.

In the context of methods according to embodiments of the invention described herein, the pointer device may be operable in more than one mode. Therefore, in one embodiment, the pointer device functions in a first mode, or "normal" mode that is characterized by the pointer device providing the commonly used features that persons of ordinary skill in the art would associate with a conventional computer mouse, tracking ball, touch pad or the like. Specifically, conventional applications such as word processing, browsing the internet, sending and receiving email messages and the like, are available in the normal mode of operation. With respect to performing secure transactions the pointer device may be switched into a second mode, i.e., a "secure" mode. In the second or secure mode, the pointer device is switched into the secure mode and the client computer re-routes the client request to the pointer device, rather than to a destination server computer. In the secure mode the pointer device establishes the first communication protocol providing mutual authentication and encryption end to end between the server computer and the pointer device. In the secure mode client requests are routed from the browser application via a proxy application to the hardware device and from the hardware device via the proxy application to the server computer. Furthermore, server responses from the server computer are routed via the proxy application to the pointer device and from the pointer device via the proxy application to the browser application.

In the secure mode the pointer device is operable to present predefined transaction information to the user by its display means. According to embodiments of the invention the secure mode may have a first sub-mode and a second sub-mode. In the first sub-mode the messages exchanged between the client computer and the server computer do not comprise any predefined transaction information. In this first sub-mode the pointer device may still provide the functions of the first mode or "normal" mode to the user. As an example, in the first sub-mode the pointer device may still provide the usual mouse functionality to the user, while in parallel providing in the background the secure interface for an electronic transaction by means of the first communication protocol. The second sub-mode of the secure mode may be invoked when the pointer device detects predefined transaction information to be displayed by the display means. As the predefined transaction information has to be checked and confirmed by the user, the functionality that the pointer device provides in the normal mode is disabled or interrupted. As an example, in the second sub-mode the pointer device does not provide the usual mouse functionality anymore. This may provide an indication or alert to the user that she shall check the predefined transaction information displayed by the display means of the pointer device. Upon confirmation of the predefined transaction information the pointer device may automatically return to the first sub-mode and the user may continue the transaction session while using the normal functionality of the pointer device until again predefined transaction information will be displayed to prompt for user confirmation.

Figure 10:
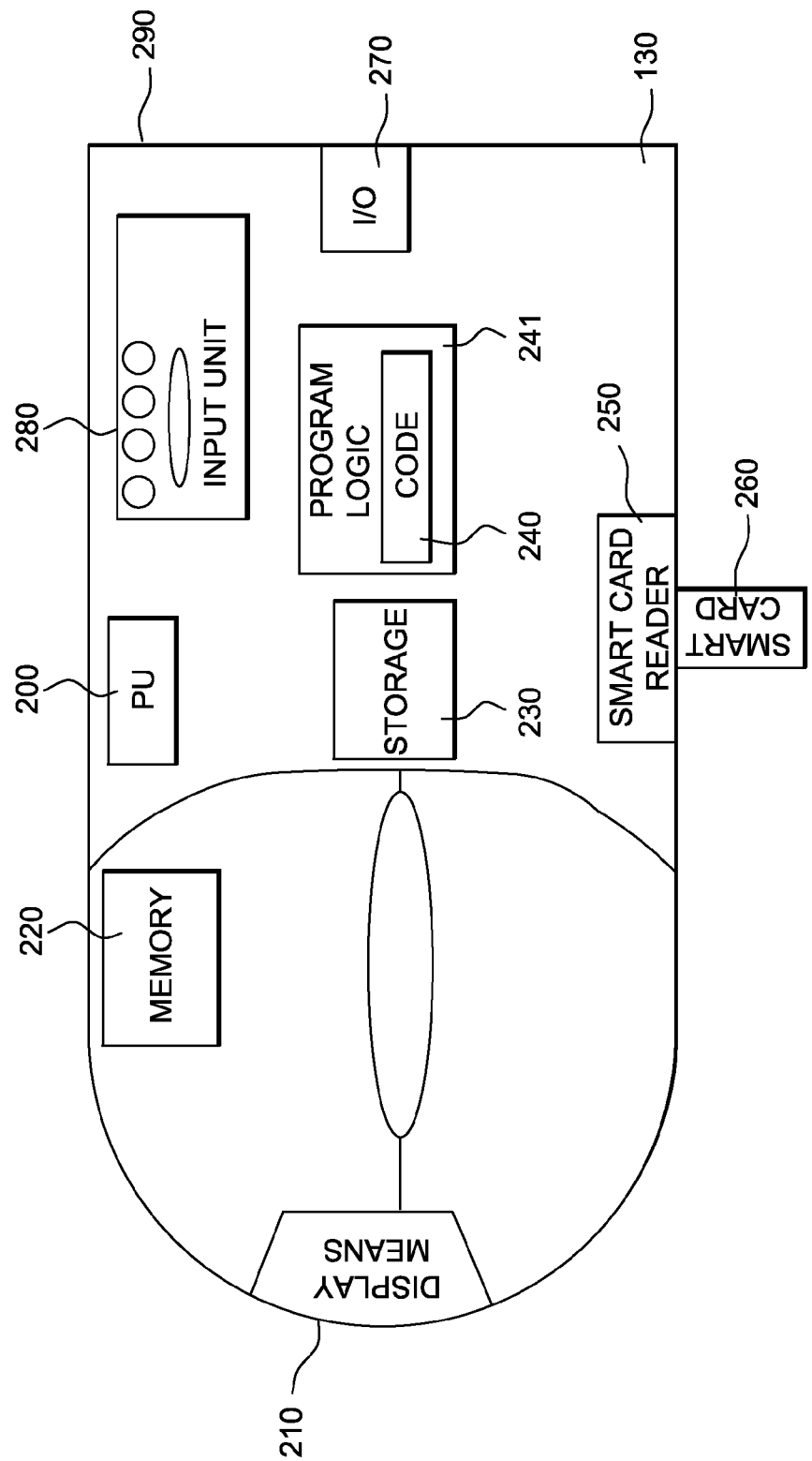
FIG. 10 is a block diagram of a hardware device according to another embodiment of the present invention.

FIG. 10 illustrates the components shown in the block diagrams of FIGS. 2 and 3, incorporated into a pointer device such as a conventional mouse-like device according to embodiments of the invention. It should be noted that the illustrations are not drawn to scale and are not meant to limit any embodiment of the pointer device of the present invention to a specific size range or shape. The illustration provides a single example of how the pointer device may be physically combined with conventional mouse-like features. For example, FIG. 10 illustrates the conventional layout of the right and left click panels (not numbered) with a scrolling wheel (not numbered) positioned in between the panels. The illustration further places the display means 210 in a suitable position to function in one or more possible ways (see FIG. 11A, 11B below). In addition, the hardware device may comprise an input unit 280. The embodiment of the input unit 280 shown provides at least one button (not numbered) for responding to various queries and at least a confirmation button only for easy and quick entry of affirmative or "yes" responses to specific queries. In addition, the input unit 280 includes a small scroll wheel (not numbered). This non-limiting illustration is not meant to exclude alternative methods of integrating an input unit into the pointer device. According to other embodiments of the invention the right and left click panels and the scrolling wheel (normal mouse buttons already available) can be used as OK/Cancel buttons to confirm transaction data. As further example, a USB port or other connecting means may be included in the pointer device through which a keyboard device or a touchpad can be operably connected to the pointer device in secure mode. This arrangement may be useful for executing transactions that require more complicated input than pressing a button to signal continue, confirm or cancel, and the like. As mentioned above, the display means 210 may also be varied to work in different ways.

For example, FIG. 11A demonstrates an embodiment of the display means as an LED or laser device 210 as a projecting unit for projecting an image of security sensitive information on the table surface upon which the pointer device is supported. Alternatively, a sheet of paper or virtually any material that can be properly positioned relative to the projecting unit can function as a "projection screen" in order to securely view the displayed data. For illustrative purposes, the data, e.g., social security number, account number, passwords and the like, are illustrated in the path of the projecting unit. The projection is similar to a small footprint that may be securely kept from public view, i.e., any person other than the user. Alternatively, as shown in FIG. 11B, the display means 210 may actually be an integrated conventional LED display similar to a computer or PDA device display. In another embodiment, the display is not integral with the pointer device 130, but would operably connect via a USB or other port. In an even further embodiment, a display screen may be integrated into a peripheral keyboard or other input unit. In such an embodiment, the keyboard/display unit may operably connect to the pointer device via cable or wireless/optical means. The projection on the display screen is similar to a small footprint that may be securely kept from public view, i.e., any person other than the user.

According to an embodiment of a method of the invention displaying of predefined transaction information comprises displaying the client request comprising the predefined transaction information and a request for confirmation on a screen on the pointer device.

According to an embodiment of the invention displaying of predefined transaction information comprises the pointer device projecting the client request comprising the predefined transaction information and a request for confirmation onto a suitable surface. The projecting may be performed by a laser projection device. The suitable surface is any surface upon which the pointer device is placed.

Figure 12:
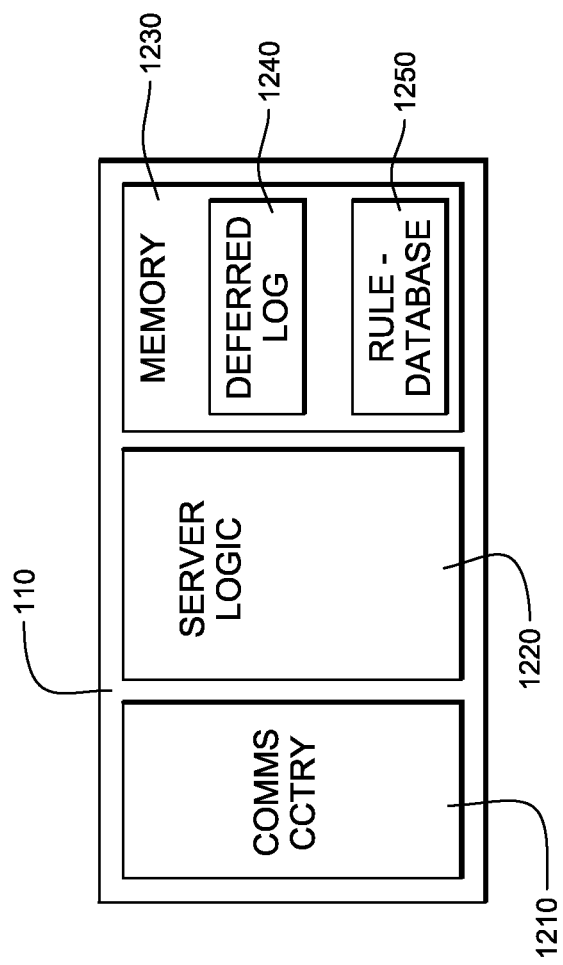
FIG. 12 is a block diagram of a server computer according to another embodiment of the present invention.

FIG. 12 shows an embodiment of a server computer 110. The server computer 110 comprises communications circuitry 1210 for interfacing with the communication network(s) 160 and server logic 1220 for performing the various functions of an electronic transaction, e.g. on-line banking service. In addition, server computer 110 comprises memory 1230 containing various data used by the server logic 1220 in operation. This may include a deferred transaction log 1240, the purpose of which is described below, and a rule database 1250. Rule database 1250 defines predefined transaction information which shall require user confirmation before execution/performance. As an example, the rule data stored in database 1250 may indicate that payment transactions need user confirmation before execution. The rule structure in database 1250 may range from a simple rule-set to a complex data structure depending on the particular application. In general, server logic 1220 could be implemented in hardware, software or a combination thereof, though we assume here that this logic is implemented by software running on server computer 110.

The deferred transaction log 1240 may be used to store data of a transaction requested by a user that has been deferred as it requires user confirmation.

The described techniques can be implemented as a method, apparatus or article of manufacture involving software, firmware, micro-code, hardware and/or any combination thereof. The term "article of manufacture" as used here refers to code or logic implemented in a medium, where the medium can include hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), or volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded can also include transmission signals propagating through space or a transmission media, such as an optical fiber, copper wire, etc. The transmission signal in which the code or logic is encoded can further include a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal can be decoded and stored in hardware or a computer readable medium at the receiving and transmitting stations or devices. Additionally, the "article of manufacture" can include a combination of hardware and software components in which the code is embodied, processed, and executed. Of course, those skilled in the art will recognize that many modifications can be made without departing from the scope of embodiments, and that the article of manufacture can include any information bearing medium. For example, the article of manufacture can include a storage medium storing instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other can communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like can be described in a sequential order, such processes, methods and algorithms can be configured to work in alternate orders. In other words, any sequence or order of steps that can be described does not necessarily indicate a requirement that the steps be performed in that order. The steps of processes described here can be performed in any practical order. In addition, some steps can be performed simultaneously, in parallel, or concurrently.

When a single device or article is described, it will be apparent that more than one device/article (whether or not they cooperate) can be used in place of a single device/article. Similarly, where more than one device or article is described herein (whether or not they cooperate), it will be apparent that a single device/article can be used in place of the more than one device or article. The functionality and/or the features of a device can be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after, either or both of the following a) conversion to another language, code or notation; b) reproduction in a different material form.

What is claimed is:

1. A hardware device for controlling electronic transactions, the hardware device comprising a user interface for presenting information to a user and a hardware device interface unit for coupling the hardware device to a proxy application on a client computer, said hardware device comprising:

a memory storing a program; and a processor device configured for executing the program and interacting with said proxy application on the client computer via the hardware device interface unit, wherein the proxy application on said client computer is configured to forward client requests received from a browser application executing at the client computer to the hardware device; and wherein the proxy application is further configured to: forward client requests from the hardware device via a communication network to a server computer, and forward server responses received from the server computer to the hardware device and from the hardware device to the browser application on said client computer;

wherein the memory of the hardware device is fused such as to prevent any further programs from being loaded and run on the hardware device.

2. The hardware device according to claim 1, wherein the proxy application configures a processor device to read and write a virtual file on the hardware device.

* * * * *